United States Patent
Na et al.

(10) Patent No.: US 10,501,012 B2
(45) Date of Patent: Dec. 10, 2019

(54) LAMP FOR VEHICLE, AND VEHICLE

(71) Applicant: LG ELECTRONICS INC., Seoul (KR)

(72) Inventors: Taeyoung Na, Seoul (KR); Sangshin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 15/854,864

(22) Filed: Dec. 27, 2017

(65) Prior Publication Data

US 2018/0281671 A1 Oct. 4, 2018

(30) Foreign Application Priority Data

Mar. 30, 2017 (KR) ........................ 10-2017-0041045

(51) Int. Cl.
| | |
|---|---|
| *B60Q 1/50* | (2006.01) |
| *F21S 41/675* | (2018.01) |
| *F21S 41/36* | (2018.01) |
| *F21S 41/39* | (2018.01) |
| *F21S 43/31* | (2018.01) |
| *F21S 41/40* | (2018.01) |
| *F21S 41/20* | (2018.01) |
| *F21S 43/20* | (2018.01) |
| *B62D 31/00* | (2006.01) |

(52) U.S. Cl.
CPC .............. *B60Q 1/50* (2013.01); *B62D 31/00* (2013.01); *F21S 41/285* (2018.01); *F21S 41/36* (2018.01); *F21S 41/39* (2018.01); *F21S 41/40* (2018.01); *F21S 41/675* (2018.01); *F21S 43/26* (2018.01); *F21S 43/31* (2018.01); *B60Q 2400/50* (2013.01)

(58) Field of Classification Search
CPC ........ B60Q 1/50; F21S 41/675; F21S 41/285; F21S 43/31; F21S 41/39; F21S 43/26; B62D 31/00

See application file for complete search history.

(56) References Cited

U.S. PATENT DOCUMENTS

| 6,059,435 A * | 5/2000 | Hamm | H05B 41/36 |
| | | | 362/514 |
| 2006/0126353 A1 * | 6/2006 | Ishida | F21V 7/0091 |
| | | | 362/543 |

(Continued)

FOREIGN PATENT DOCUMENTS

| EP | 2159479 | 3/2010 |
| EP | 2546569 | 1/2013 |

(Continued)

OTHER PUBLICATIONS

Extended European Search Report in European Application No. 17000880.9, dated Dec. 21, 2017, 7 pages.

*Primary Examiner* — Sharon E Payne
(74) *Attorney, Agent, or Firm* — Fish & Richardson P.C.

(57) ABSTRACT

A lamp for a vehicle includes: a lens; a first light source positioned at a rear side of the lens and configured to generate a first light; a first reflector configured to reflect the first light toward the lens; a second light source positioned at the rear side of the lens and configured to generate a second light; and a second reflector configured to reflect the second light toward the lens, wherein the first light source is configured to output the first light in a first direction, and the second light source is configured to output the second light in the first direction.

15 Claims, 21 Drawing Sheets

(56) References Cited

U.S. PATENT DOCUMENTS

2008/0062709 A1 3/2008 Mochizuki et al.
2013/0215634 A1* 8/2013 Tseng .................. F21S 41/147
                                                        362/516

FOREIGN PATENT DOCUMENTS

| JP | 2014-120342 | 6/2014 |
| JP | 2015115276 A | 6/2015 |
| KR | 10-2012-0127046 | 11/2012 |
| KR | 10-2015-0068117 | 6/2015 |
| KR | 2016035210 A | 3/2016 |
| KR | 10-2016-0065558 | 6/2016 |
| KR | 2016062780 A | 6/2016 |

* cited by examiner

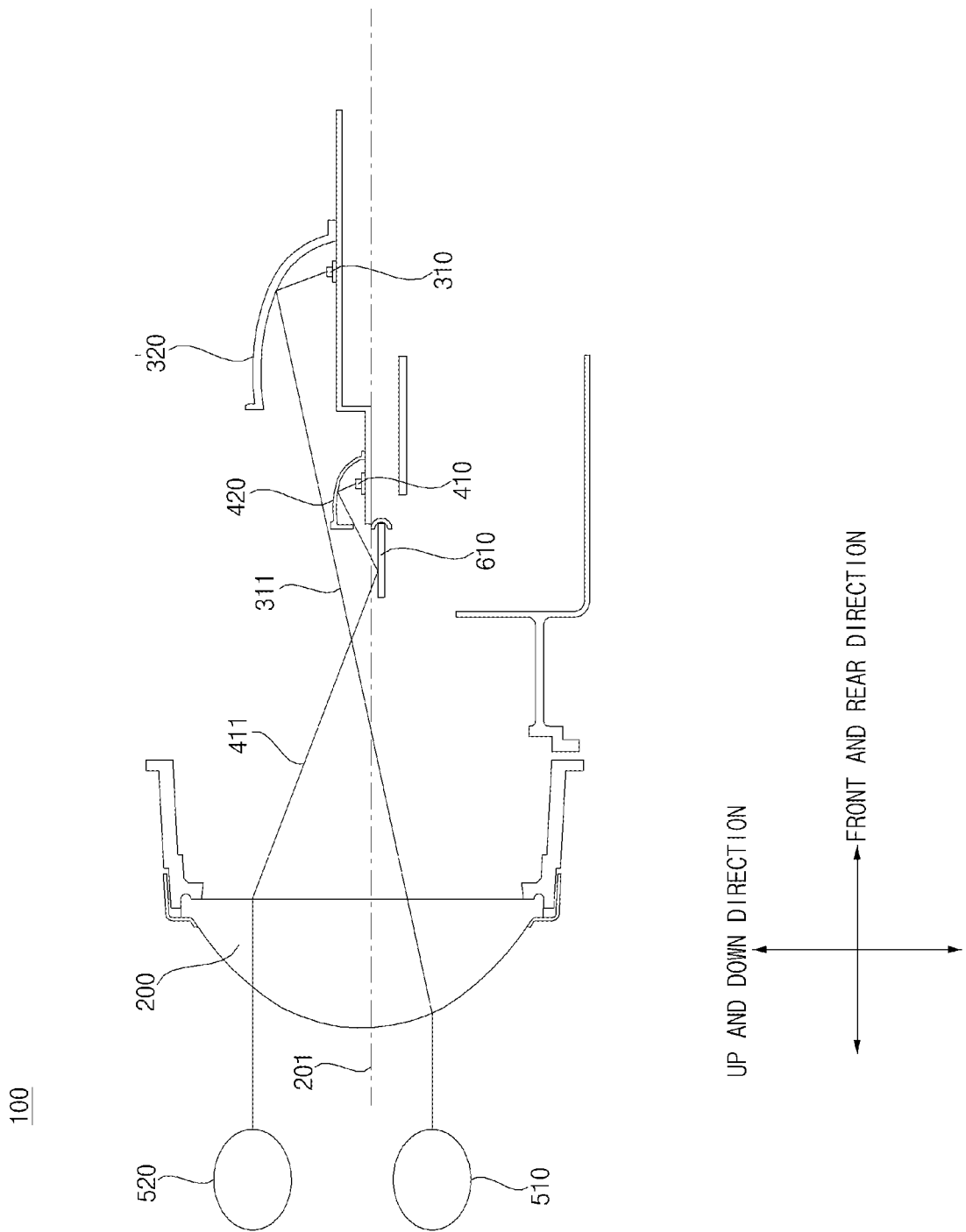

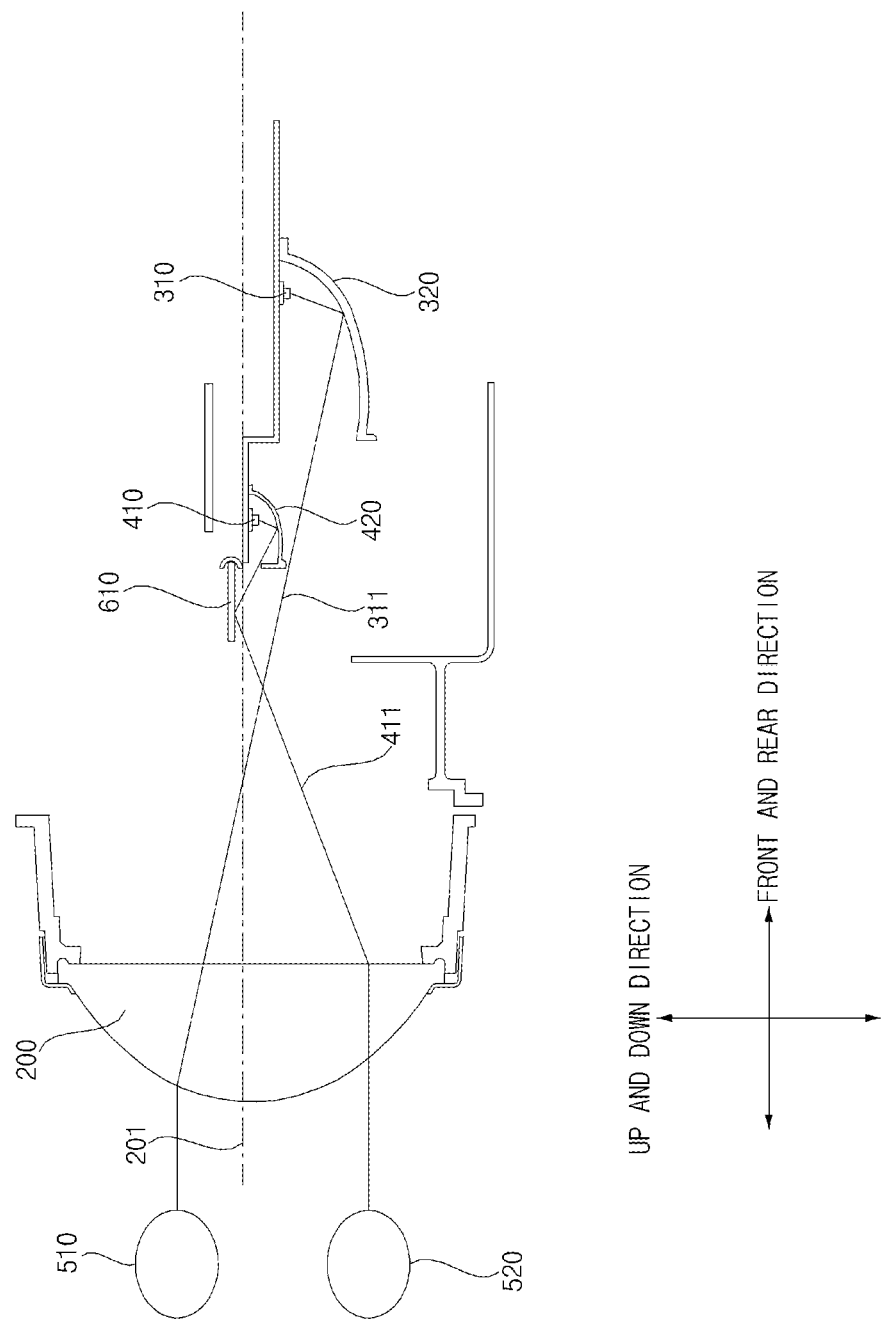

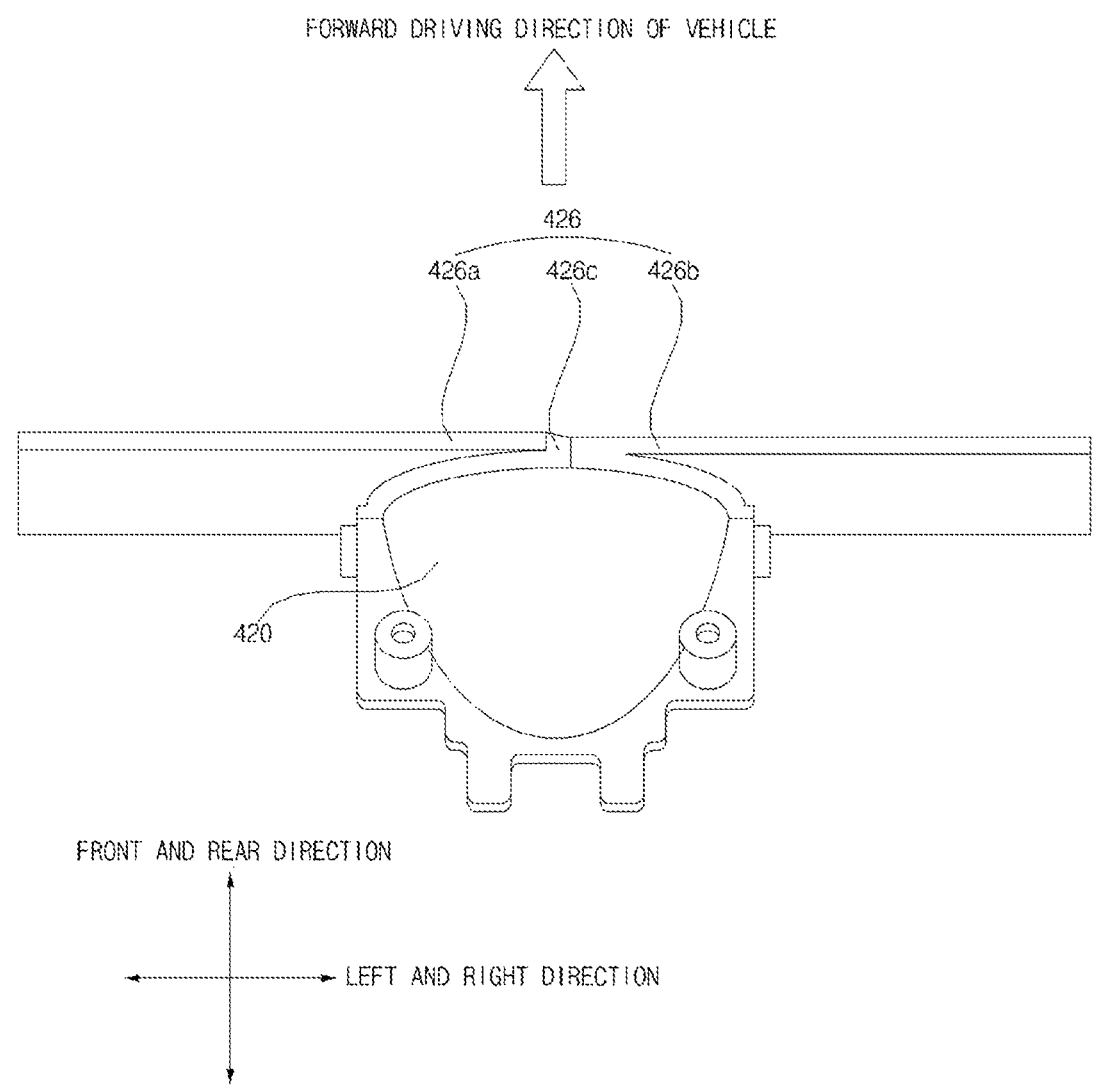

(a)

(b)

(a)

(b)

(c)

(a)

(b)

(c)

LAMP FOR VEHICLE, AND VEHICLE

CROSS-REFERENCE TO RELATED APPLICATION

This application claims an earlier filing date and right of priority to Korean Patent Application No. 10-2017-0041045, filed on Mar. 30, 2017 in the Korean Intellectual Property Office, the content of which is incorporated herein by reference in its entirety.

TECHNICAL FIELD

The present disclosure relates to a lamp for a vehicle, and a vehicle including the same.

BACKGROUND

A vehicle is an apparatus that moves in a direction desired by a user riding therein. A representative example of a vehicle may be an automobile.

A variety of lamps are typically provided in a vehicle. For example, a headlamp and rear combination lamps are commonly provided in a vehicle.

In some cases, a headlamp facilitates outward visibility for a driver at night. Typically, a headlamp outputs a low beam or a high beam according to a beam pattern.

SUMMARY

Implementations disclosed herein provide a lamp for a vehicle that adaptively provides various beam patterns for various driving situations.

In one aspect, a lamp for a vehicle includes: a lens; a first light source positioned at a rear side of the lens and configured to generate a first light; a first reflector configured to reflect the first light toward the lens; a second light source positioned at the rear side of the lens and configured to generate a second light; and a second reflector configured to reflect the second light toward the lens, wherein the first light source is configured to output the first light in a first direction, and the second light source is configured to output the second light in the first direction.

Implementations may include one or more of the following features. For example, the second reflector is positioned between the first reflector and the lens.

In some implementations, the second reflector is configured and positioned to block a portion of the first light reflected by the first reflector.

In some implementations, a portion of the first light not blocked by the second reflector passes through the lens to form a first beam pattern.

In some implementations, the second reflector includes: a reflection part having a first surface and a second surface and configured to reflect the second light on the first surface; and a shield part formed on the second surface of the reflection part opposite to the first surface.

In some implementations, the first reflector is positioned above the first light source and the first light source is configured to output the first light toward the first reflector in an upward direction, and the second reflector is positioned above the second light source and the second light source is configured to output the second light toward the second reflector in the upward direction.

In some implementations, the lamp further includes a third reflector configured to reflect the second light reflected by the second reflector.

In some implementations, the second light reflected by the third reflector passes through the lens to form a second beam pattern.

In some implementations, the second beam pattern is biased forward or backward with respect to a reference line, the reference line corresponding to a projection of a horizontal centerline of the lens formed on an entire illumination area of the lamp.

In some implementations, the lamp further includes a transparent display configured to form an image of a specific content such that during operation, the image of the specific content is formed on a surface.

In some implementations, the lamp further includes: a driving unit configured to provide a driving force; and a driving force transfer unit configured to transfer the driving force to the third reflector, wherein the third reflector is configured to, based on the driving force, rotate in an up and down direction about a shaft arranged along a left and right direction of the vehicle.

In some implementations, a projection length of the second light varies depending on the rotation of the third reflector.

In some implementations, the third reflector includes: a first mirror; a second mirror; and a hinge formed between the first mirror and the second mirror.

In some implementations, the lamp further includes: a driving unit configured to provide a driving force; and a driving force transfer unit configured to transfer the driving force to the first mirror and the second mirror, wherein the first mirror and the second mirror are configured to, based on the driving force, rotate toward each other in an up and down direction about a hinge shaft arranged along a front and rear direction of the vehicle.

In some implementations, a projection width of the second light varies depending on the rotation of the first mirror and the second mirror.

In some implementations, the lamp further includes: a first driving unit configured to provide a first driving force; a first driving force transfer unit configured to transfer the first driving force to the first mirror; a second driving unit configured to provide a second driving force; and a second driving force transfer unit configured to transfer the second driving force to the second mirror.

In some implementations, the first mirror is configured to, based upon the first driving force, rotate in an up and down direction about a hinge shaft arranged along a front and rear direction, and the second mirror is configured to, based upon the second driving force, rotate in the up and down direction about the hinge shaft.

In another aspect, a lamp for a vehicle includes: a lens; a first light source positioned at a rear side of the lens and configured to generate a first light; a first reflector configured to reflect the first light toward the lens; a second light source positioned at the rear side of the lens and configured to generate a second light; and a second reflector configured to reflect the second light toward the lens, wherein the second reflector is configured and positioned to block a portion of the first light reflected by the first reflector.

Implementations may include one or more of the following features. For example, the first light source is configured to output the first light in a first direction, and the second light source is configured to output the second light in the first direction.

In another aspect, a vehicle includes: a plurality of wheels; a power source configured to drive at least two of the plurality of wheels; and the lamp for the vehicle."

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIGS. 3B and 3C are diagrams illustrating examples of different configurations of a lamp for a vehicle according to some implementations;

FIG. 5B is a top view illustrating an example of a second reflector and a cutoff shield according to some implementations;

DETAILED DESCRIPTION

A lamp for a vehicle is described herein that adaptively provides various beam patterns for various driving situations.

In some implementations, the lamp occupies a smaller volume as the first and second light sources are arranged to output a light in the same direction.

In some implementations, a movement of a third reflector may be controlled to generate a beam pattern necessary or suitable for a situation.

In some implementations, a transparent display provided in the lamp enables projecting of an image to the road surface.

In accordance with an implementation of the present disclosure, a lamp for a vehicle includes: a lens; a first light source positioned behind the lens; a first reflector configured to reflect a first light, generated by the first light source, toward the lens; a second light source positioned behind the lens; and a second reflector configured to reflect a second light, generated by the second light source, toward the lens, wherein the first light source is configured to output the first light in a first direction, and the second light source is configured to output the second light in the first direction.

A vehicle as described in this specification may include, for example, an automobile or a motorcycle or any suitable motorized vehicle. Hereinafter, a description will be given based on an automobile.

A vehicle as described in this specification may be powered by any suitable power source, and may be an internal combustion engine vehicle including an engine as a power source, a hybrid vehicle including both an engine and an electric motor as a power source, or an electric vehicle including an electric motor as a power source.

In some implementations, a vehicle may be an autonomous vehicle.

In the following description, "the left side" may refer to the left side in the forward driving direction of the vehicle, and "the right side" may refer to the right side in the forward driving direction of the vehicle.

In addition, "upward" may refer to the opposite direction to gravity. An upward direction may refer to a direction to the top. Furthermore, "downward" may refer to the direction to gravity. A downward direction may refer to a direction to the bottom.

Figure 1:
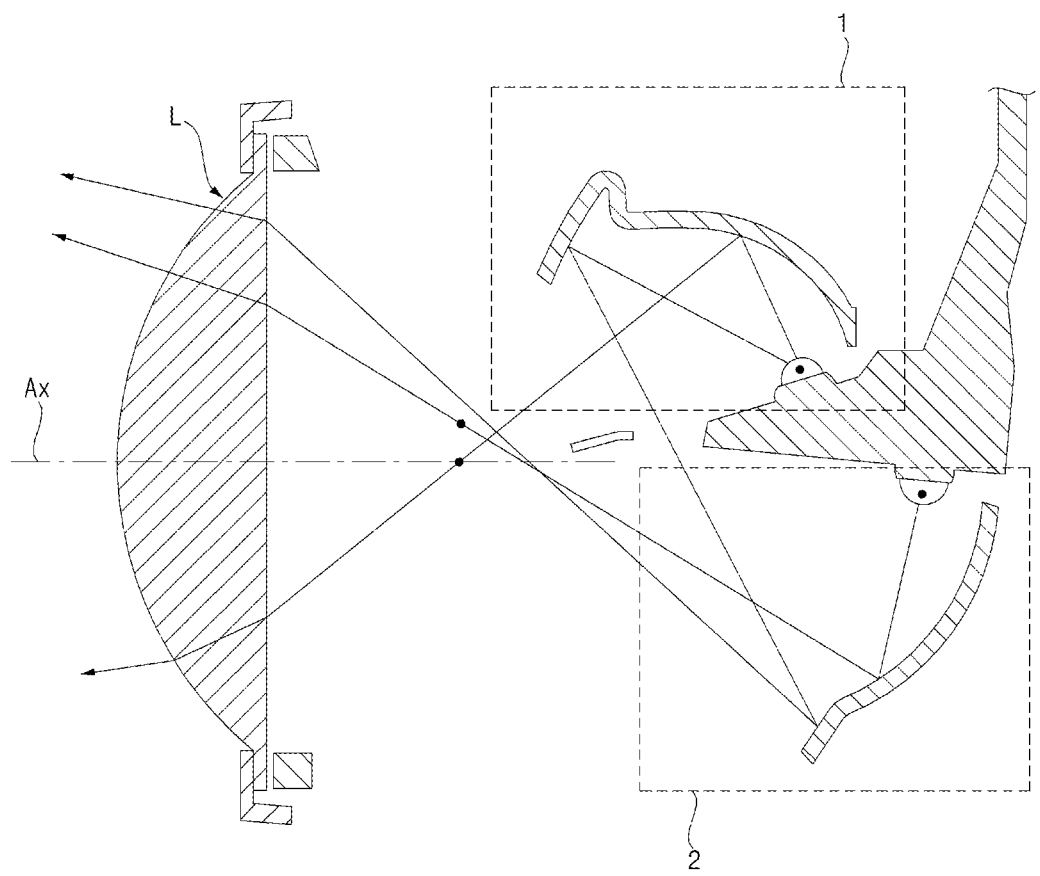
FIG. 1 is a cross-sectional view of one possible design of a lamp for a vehicle.

FIG. 1 is an example of a headlamp that is implemented in some scenarios. Referring to FIG. 1, the headlamp includes a low beam module 1 and a high beam module 2. The low beam module 1 is positioned above an optical axis Ax of a lens L, while the high beam module 2 is positioned below the optical axis Ax of the lens L.

In this case, it is necessary to secure space below and above the optical axis Ax of the lens L in order to arrange components.

Figure 2:
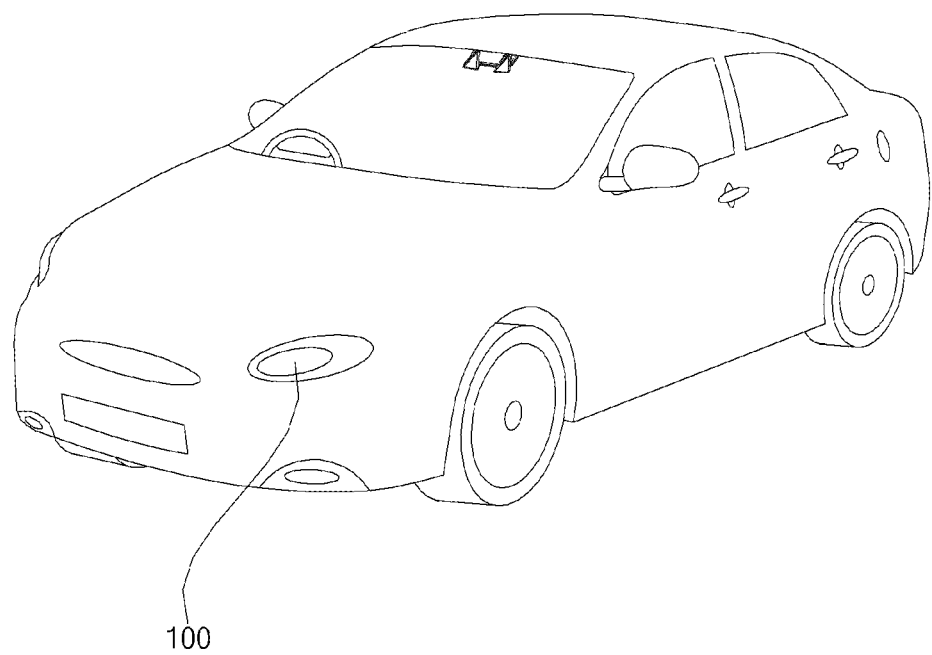
FIG. 2 is a diagram illustrating an external appearance of an example of a vehicle according to some implementations disclosed herein.

FIG. 2 illustrates an external appearance of an example of a vehicle.

Referring to FIG. 2, a vehicle 10 may include wheels able to be rotated by a power source, and a steering input device for adjusting a direction of travel of the vehicle 10.

The vehicle 10 may include a lamp 100 for a vehicle.

The lamp 100 may include a head lamp.

The term "overall length" corresponds to the length from the front end to the rear end of the vehicle 10, the term "overall width" corresponds to the width of the vehicle 10, and the term "overall height" corresponds to the height from the bottom of the wheel to the roof. In the following description, the term "overall length direction L" may correspond to the reference direction for the measurement of the overall length of the vehicle 10, the term "overall width direction W" may correspond to the reference direction for the measurement of the overall width of the vehicle 10, and the term "overall height direction H" may correspond to the reference direction for the measurement of the overall height of the vehicle 10.

Figure 3A:
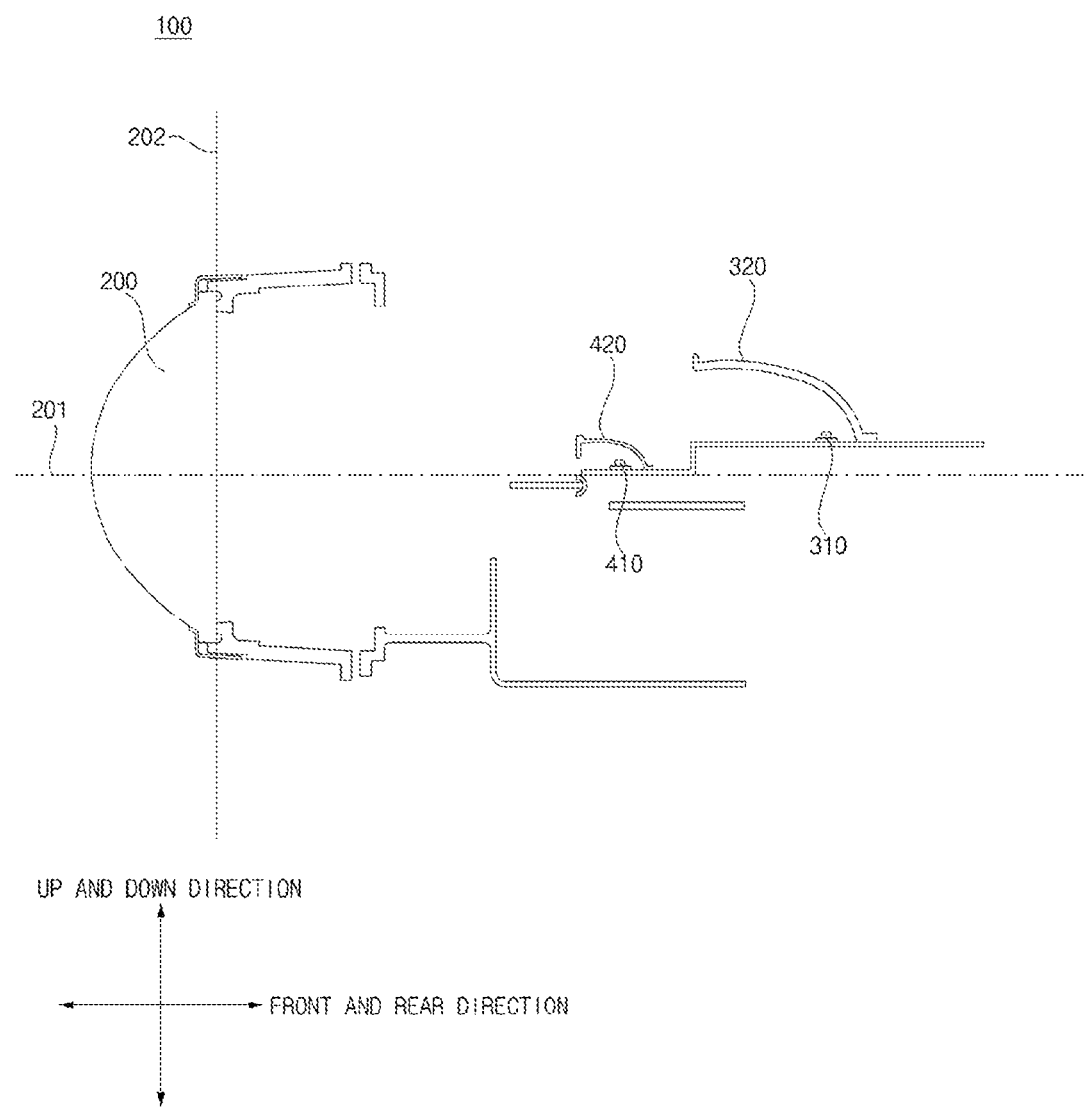
FIG. 3A is a cross-sectional view illustrating an example of a lamp for a vehicle according to some implementations.

FIG. 3A illustrates a cross-sectional view of an example of a lamp for a vehicle.

Referring to FIG. 3A, the lamp 100 may include a lens 200, a first light source 310, a first reflector 320, a second light source 410, and a second reflector 420.

The lens 200 may be positioned before the first light source 310, the first reflector 320, the second light source 410, and the second reflector 420.

The lens 200 may refract and transmit a first light generated by the first light source 310. For example, the lens 200 may refract and transmit the first light generated by the first light source 310 and reflected from the first reflector 320 toward the road in front of the vehicle 10.

The lens 200 may refract and transmit a second light generated by the second light source 410. For example, the lens 209 may refract and transmit the second light generated by the second light source 410 and reflected from the second reflector 420 toward the road in front of the vehicle 10.

The lens 200 may determine an area to which a light is projected from the vehicle 10.

The lens 200 may have a predetermined optical axis 201. The optical axis 201 of the lens 200 may be an axis that is orthogonal to a plane 202 which is in contact with the rear-end cross-section of the lens 200 and perpendicular to a horizontal plane.

In some implementations, the lens 200 may be an aspheric lens.

In some implementations, the lens 200 may be made of a transparent material. For example, the lens 200 may be formed of glass or plastics.

The first light source 310 may be positioned behind the lens 200.

The first light source 310 may be positioned behind the second light source 410 and the second reflector 420.

The first light source 310 may output a first light in the same direction as of a light output from the second light source 410.

In some implementations, referring to FIG. 3B, the first light source 310 and the second light source 410 may respectively output a first light and a second light in a first direction. For example, the first direction may be an upward direction.

In some implementations, referring to FIG. 3C, the first light source 310 and the second light source 410 may be mounted in a downward direction, and may respectively output a first light and a second light in a second direction. For example, the second direction may be a downward direction.

The first reflector 320 may have a front open portion and accommodate the first light source 310.

The first reflector 320 may be positioned behind the lens 200.

The first reflector 320 may be positioned behind the second light source 420 and the second reflector 420.

The first reflector 320 may reflect a first light, which is generated by the first light source 310, toward the lens 200.

The first reflector 320 may reflect the first light, so that the first light is projected toward the road in front of the vehicle 10.

The first reflector 320 may be formed of a material having a high reflectivity. Alternatively, a surface of the first reflector 320 facing the first light source 310 may be coated with a material having a high reflectivity. For example, the material having a high reflectivity may be aluminum (Al) or silver (Ag).

The second light source 410 may be disposed positioned behind the lens 200.

The second light source 410 may be positioned before the first light source 310 and the first reflector 320.

The second light source 410 may output a second light in the same direction as a light output from the first light source 310.

The second reflector 410 may have a front open portion and accommodate the second light source 410.

The second reflector 420 may be positioned behind the lens 200.

The second reflector 420 may be positioned before the first light source 310 and the first reflector 320.

The second reflector 420 may reflect a second light, which is generated by the second light source 410, toward the lens 200.

The second reflector 420 may be formed of a material having a high reflectivity. Alternatively, a surface of the second reflector 420 facing the second light source 410 may be coated with a material having a high reflectivity. For example, the material having a high reflectivity may be aluminum (Al) or silver (Ag).

In some implementations, a lamp for a vehicle may further include an outer lens.

The outer lens covers the opening part of a housing that defines the external appearance of the lamp for vehicle.

The outer lens may be positioned forward of the lens 200.

In some implementations, the outer lens is made of a transparent plastic or glass material. The outer lens is generally formed of an ALDC plastic material having excellent thermal conductivity.

FIGS. 3B and 3C illustrate different configurations of a lamp for a vehicle.

Referring to FIG. 3B, the first light source 310 may output a first light in a first direction.

For example, the first light source 310 may output a first light 311 upward toward the first reflector 320.

In some implementations, the first light source 310 may be positioned to face upward.

In some implementations, the first light source 310 may be positioned above the optical axis 201 of the lens 200.

The first reflector 320 may reflect the first light 311, which is output from the first light source 310, toward the lens 200.

For example, the first reflector 320 may reflect an incident first light 311 forward and downward. After passing through the lens 200, the first light 311 may be adjusted to travel in a direction parallel to the optical axis 201 of the lens 200.

In some implementations, the first reflector 320 may be positioned above the optical axis 201 of the lens 200.

The second light source 410 may output a second light in a first direction.

For example, the second light source 410 may output a second light 411 upward toward the second reflector 420.

The second light source 410 may be positioned to face upward.

The second light source 410 may be positioned above the optical axis 201 of the lens 200.

The second reflector 420 may reflect the second light 411, output from the second light source 410, toward the lens 200.

For example, the second reflector 420 may reflect an incident second light 411 forward and downward. After passing through the lens 200, the second light 411 may be adjusted to travel in a direction parallel to the optical axis 201 of the lens 200.

The second reflector 420 may be positioned above the optical axis 201 of the lens 200.

In some implementations, the lamp 100 may further include a third reflector 610.

The third reflector 610 may be formed extending in a horizontal direction (e.g., the left and right direction).

The third reflector 610 may be formed of a material having a high reflectivity. Alternatively, a reflecting surface of the third reflector 610 may be coated with a material having a high reflectivity. For example, the material having a high reflectivity may be aluminum (Al) or silver (Ag).

The second reflector 420 may reflect the second light 411, output from the second light source 410, toward the third reflector 610. Then, the third reflector 610 may reflect the second light 411, reflected from the second reflector 420, toward the lens 200. In this case, the third reflector 610 may reflect the second light 411, which is reflected downward by the second reflector 420, upward.

For example, the third reflector 610 may reflect an incident second light 411 forward and upward.

The third reflector 610 will be described in more detail with reference to FIG. 6 and other following drawings.

Referring to FIG. 3C, the first light source 310 may output a first light in a second direction.

For example, the first light source 310 may output the first light 311 downward toward the first reflector 320.

In some implementations, the first light source 310 may be arranged to face downward.

In some implementations, the first light source 310 may be positioned below the optical axis 201 of the lens 200.

The first reflector 320 may reflect the first light 311, output from the first light source 310, toward the lens 200.

For example, the first reflector 320 may reflect an incident first light 311 forward and upward. After passing through the lens 200, the first light 311 may be adjusted to travel in a direction parallel to the optical axis 201 of the lens 200.

The first reflector 320 may be positioned below the optical axis 201 of the lens 200.

The second light source 410 may output a second light in a second direction.

For example, the second light source 410 may output the second light 411 downward toward the second reflector 420.

The second light source 410 may be arranged to face downward.

The second light source 410 may be positioned below the optical axis 201 of the lens 200.

The second reflector 420 may reflect the second light, output from the second light source 410, toward the lens 200.

For example, the second reflector 420 may reflect an incident second light 411 forward and upward. After passing through the lens 200, the second light 411 may be adjusted to travel in a direction parallel to the optical axis 201 of the lens 200.

The second reflector 420 may be positioned below the optical axis 201 of the lens 200.

In some implementations, the lamp 100 may further include a third reflector 610.

The third reflector 610 may be formed extending in the horizontal direction (e.g., the left and right direction).

The third reflector 610 may be formed of a material having a high reflectivity. Alternatively, the third reflector 610 may be coated with a material having a high reflectivity. For example, the material having a high reflectivity may be aluminum (Al) or silver (Ag).

The second reflector 420 may reflect the second light 411, output from the second light source 410, toward the third reflector 610. Then, the third reflector 610 may reflect the second light 411, reflected from the second reflector 420, toward the lens 200.

The third reflector 610 may reflect the second light 411, reflected upward from the second reflector 410, downward.

For example, the third reflector 610 may reflect an incident second light 411 forward and upward.

The third reflector 610 will be described in more detail with reference to FIG. 6 and other following drawings.

Figure 4:
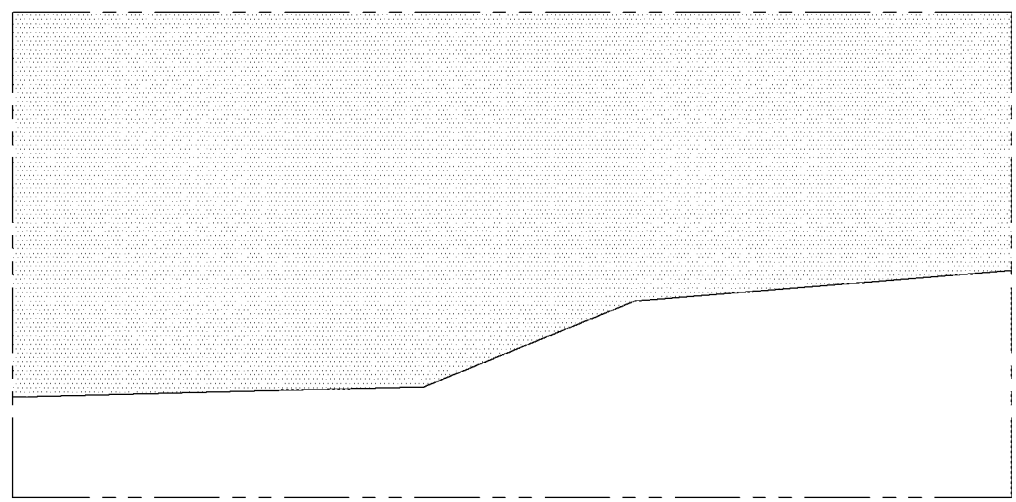
FIG. 4 is a diagram illustrating an example a pattern of a light projected by a lamp for a vehicle according to some implementations.

FIG. 4 is a diagram illustrating an example a pattern of a light projected by a lamp for vehicle. Specifically, FIG. 4 is an example of a beam pattern viewed in a forward direction from a left-hand (LH) drive vehicle 10.

Referring to FIG. 4, a light projected by the lamp 100 may have a pattern configured to prevent dazzling of a driver of an opposing vehicle.

The opposing vehicle is positioned on the left side of the vehicle 10, and thus, the left side of the illumination area is configured to be smaller than the right side thereof. In this case, the lamp 100 needs to project light such that a portion of the light projected toward the left side of the illumination area has a longer projection length than a light projected toward the right side.

Such beam patterns may be generated by structures such as those described with reference to FIGS. 5A and 5B. Accordingly, the lamp 100 according to an implementation of the present disclosure may have a beam pattern configured to mitigate dazzling of a driver of an opposing vehicle.

Figure 5A:
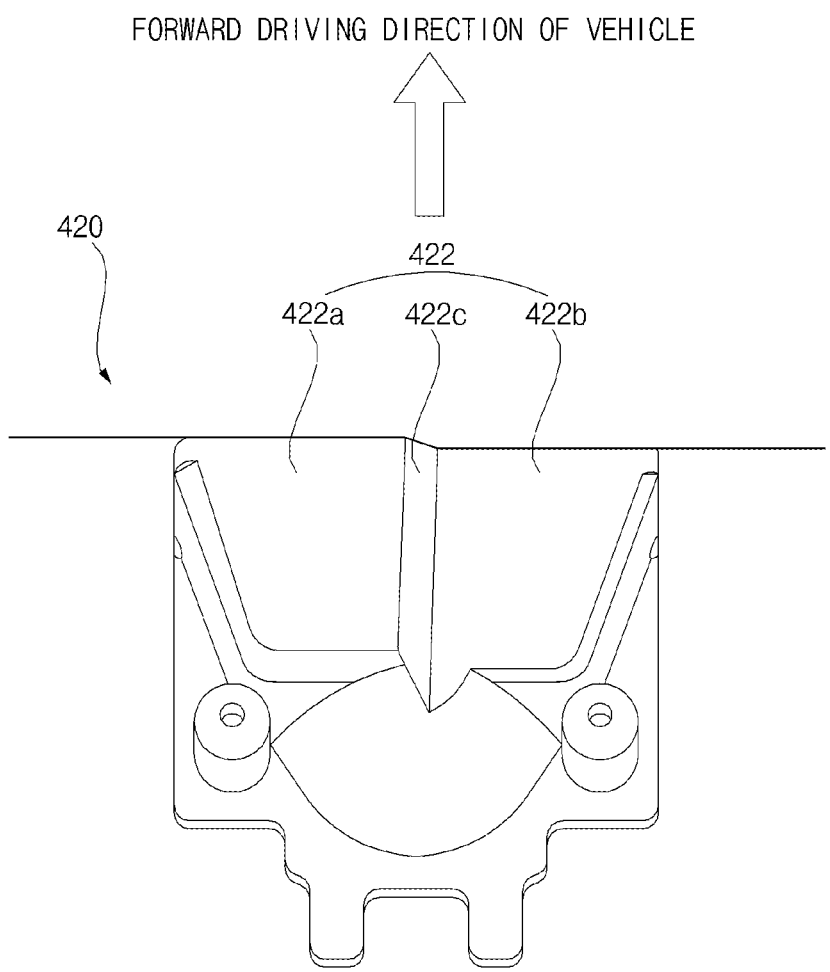
FIG. 5A is a top view illustrating an example of a second reflector according to some implementations.
Figure 5A:
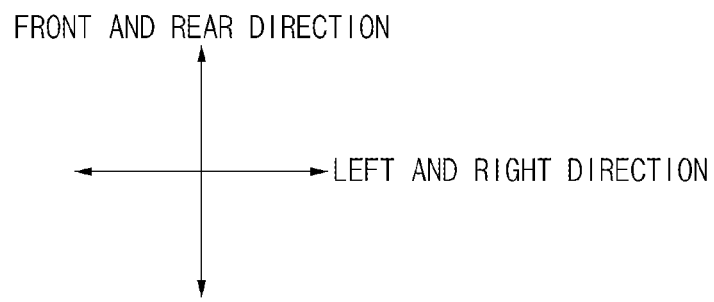

FIG. 5A illustrates a top view of an example of a second reflector. An analogous structure may be implemented in a downward direction, with the example of FIG. 5A being a bottom view.

Referring to FIG. 5A, the second reflector 420 may block part of the first light 311 reflected from the first reflector 320.

As such, the second reflector 420 may function as a cutoff shield to partially cutoff the first light 311 emanating from the first reflector 320 that is behind the second reflector 420 (e.g., as in FIGS. 3A to 3C). In this case, the second reflector 420 may be formed to be smaller in size than the first reflector 320.

A portion of the first light 311 that is not blocked by the second reflector 420 may pass through the lens 200, forming a first beam pattern 510 (see FIGS. 3A and 3B).

For example, a portion of the first light 311 not blocked by the second reflector 420, may pass through the lens 200 and be projected toward the road in front of the vehicle 10 to function as a low beam.

In some implementations, the second reflector 420 may include a reflection part and a shield part 422.

In some implementations, the reflection part may be a surface of the second reflector 420 which faces the second light source 410.

The reflection part may reflect the second light 411 generated by the second light source 410. For example, the reflection part may reflect the second light 411 toward the lens 200. As another example, the reflection part may reflect the second light 411 toward the third reflector 610.

In some implementations, the shield part 422 may be formed on the rear surface of the reflection part.

The shield part 422 may include an upper portion 422a, a lower portion 422b, and a connection portion 422c.

A step may be formed between the upper portion 422a and the lower portion 422b.

The upper portion 422a may protrude upward relative to the lower portion 422b.

The lower portion 422b may be formed to have a concave shape in an upward direction.

The connection portion 422c may connect the upper portion 422a and the lower portion 422b.

The connection portion 422c may be formed extending downward from one end of the upper portion 422a. The connection portion 422c may have a specific gradient.

The connection portion 422c may be formed extending upward from one end of the lower portion 422b.

The shape of the shield part 422 may shape the first light 311 projected toward the road in front of the vehicle 10 to have a pattern that may prevent dazzling of a driver of an opposing vehicle.

FIG. 5B illustrates a top view illustrating an example of a second reflector and a cutoff shield. An analogous structure may be implemented in a downward direction, with the example of FIG. 5B being a bottom view.

Referring to FIG. 5B, the lamp 100 may further include a separate cutoff shield, such as cutoff shield 426.

The cutoff shield 426 may be in the form of a plate. The cutoff shield 426 may stand upright, so that the surfaces thereof face forward and backward, respectively.

The cutoff shield 426 may be positioned forward of the second reflector 420 towards the lens 200.

In some implementations, one surface of the cutoff shield 426 may be in contact with the second reflector 420.

The cutoff shield 426 may have a hole 426h formed thereon. The hole 426h may transmit a light, which is generated by the second light source 410, to travel toward the lens 200.

The cutoff shield 426 may include an upper portion 426a, a lower portion 426b, and a connection portion 426c.

A step may be formed between the upper portion 416a and the lower portion 426b.

The upper portion 426a may protrude upward relative to the lower portion 426b.

The lower portion 426b may be formed to have a concave shape in a downward direction).

The connection portion 426c may connect the upper portion 426a and the lower portion 426b.

The connection portion 426c may be formed extending downward from one end of the upper portion 426a. The connection portion 426c may has a predetermined gradient.

The connection portion 426c may be formed extending upward from one end of the lower portion 426b.

The shape of the cutoff shield 426 may shape a first light 311 projected toward the road in front of the vehicle 10 to have a pattern that may prevent dazzling of a driver of an opposing vehicle.

Figure 6A:
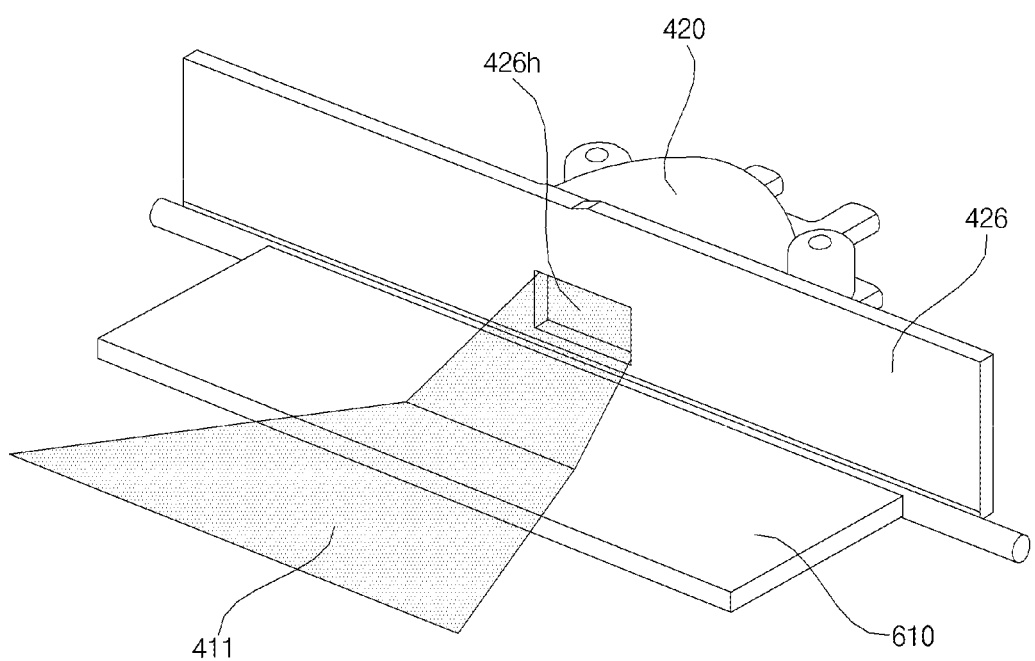
FIG. 6A is a diagram illustrating an example of a third reflector according to some implementations.
Figure 6A:
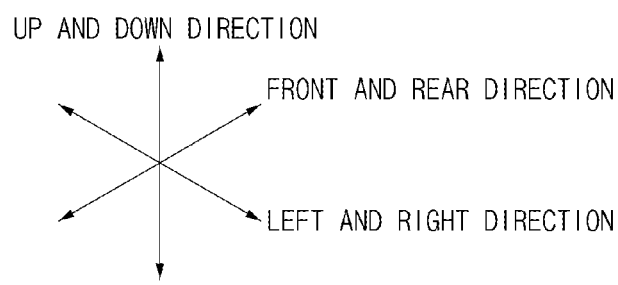

FIG. 6A illustrates an example of a third reflector.

Referring to FIG. 6A, the lamp 100 may further include a third reflector 610.

The third reflector 610 may be in the form of a plate. The third reflector 610 may be laid down, so that the large surfaces thereof face upward and downward, respectively.

The third reflector 610 may be in a rectangular shape, when viewed from the top.

The third reflector 610 may be formed extending in the left and right direction.

The third reflector 610 may reflect a second light 411 which is reflected from the second reflector 420.

The third reflector 610 may be formed of a material having a high reflectivity. Alternatively, a reflecting surface of the third reflector 610 may be coated with a material having a high reflectivity. For example, the material having a high reflectivity may be aluminum (Al) or silver (Ag).

The second reflector 420 may reflect a second light 411, which is output from the second light source 410, toward the third reflector 610.

The third reflector 610 may reflect the second light 411, which is reflected from the second reflector 420, toward the lens 200.

The third reflector 610 may reflect the second light 411, which is reflected downward from the second reflector 420, upward.

For example, the third reflector 610 may reflect an incident second light 411 forward and upward.

The second light 411 reflected from the third reflector 610 may pass through the lens 200 to thereby form a second beam pattern 520 (see FIGS. 3A and 3B).

For example, the second light 411 may be reflected from the third reflector 610, pass through the lens 200, and be projected toward the road in front of the vehicle 10 to function as a high beam.

Figure 6B:
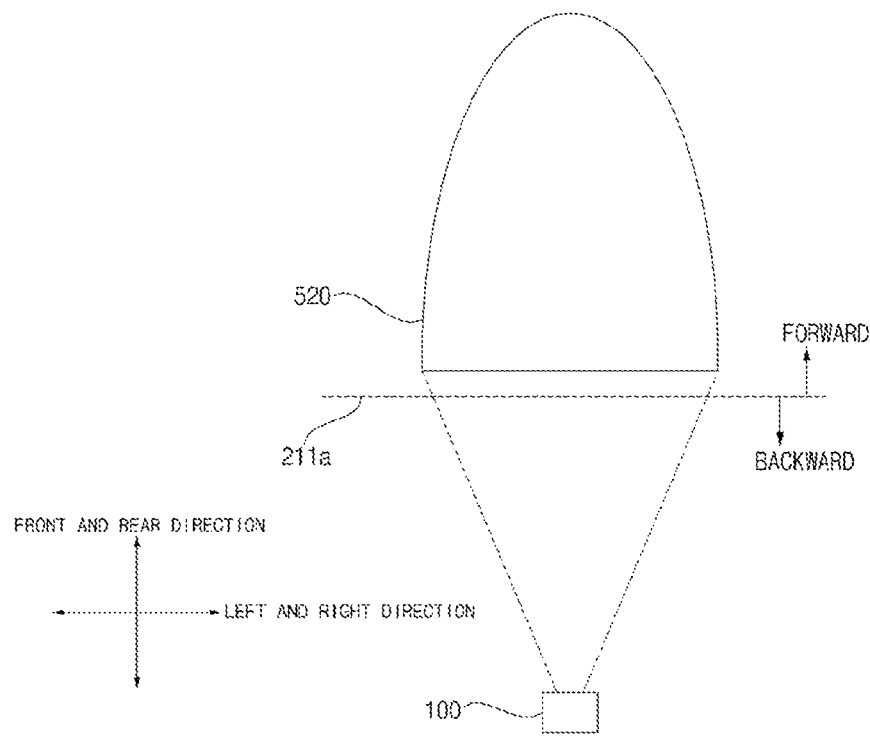
FIG. 6B is a diagram illustrating an example of a second beam pattern generated by a second light source according to some implementations.
Figure 6B:
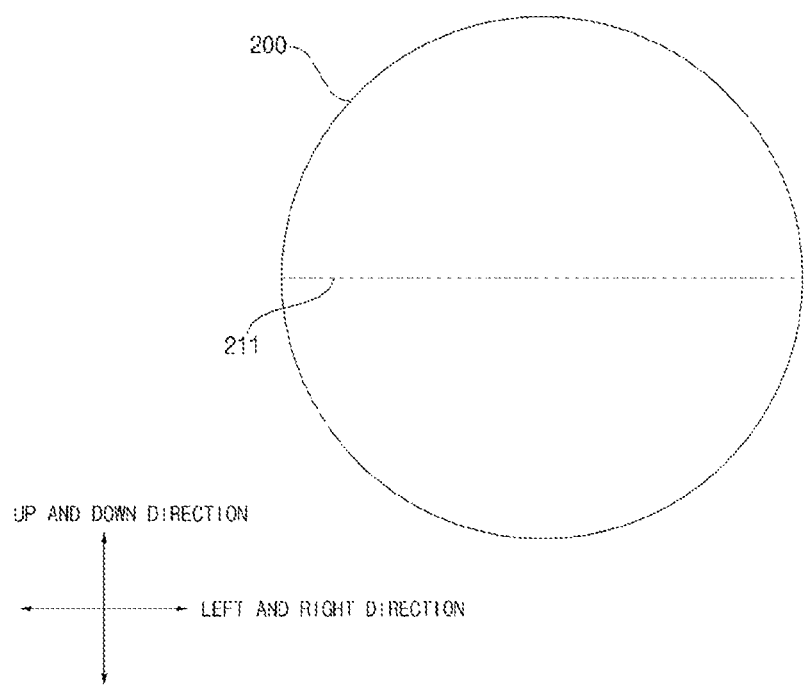

FIG. 6B illustrates an example of a second beam pattern generated by a second light source.

Referring to FIG. 6B, a second beam pattern 520 formed by a second light 411 generated by the second light source 411 may be biased forward or backward with respect to a reference line 211a, which corresponds to a centerline 211 formed in the left and right direction of the lens 200 (i.e., a horizontal centerline), through the entire illumination area.

Referring to FIG. 6B, the lens 200 has a circular shape when viewed from behind toward the forward direction.

The centerline 211 may be defined as an imaginary line that extends in the left and right direction that horizontally divides the lens 200 in half.

The reference line 211a may be defined as an imaginary line that corresponds to the centerline 211 of the lens 200 when the second light 411 is projected toward the road in front of the vehicle 10.

When the second beam pattern 520 is biased forward with respect to the reference line 211a, the second beam pattern 520 may function as a high beam.

Figure 7:
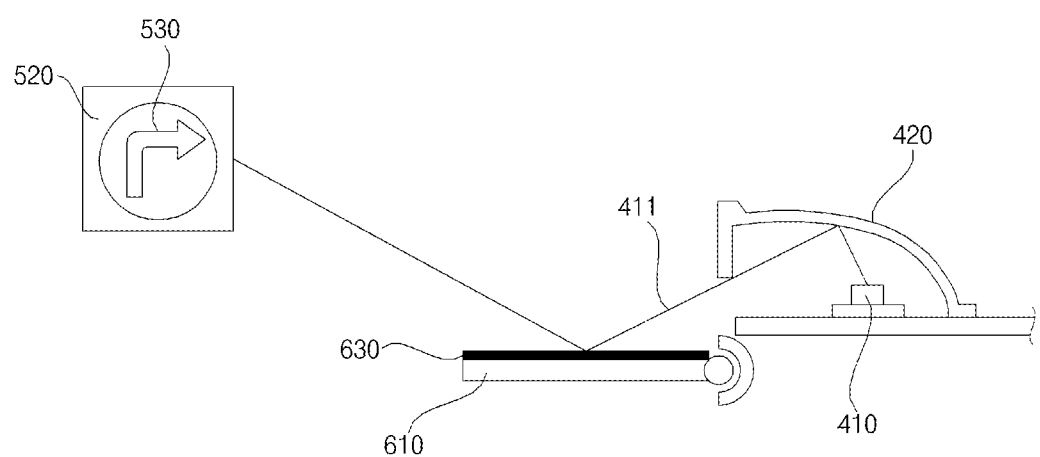
FIG. 7 is a diagram illustrating an example of a transparent display included in a lamp for a vehicle according to some implementations.

FIG. 7 illustrates an example of a transparent display included in a lamp.

Referring to FIG. 7, the lamp 100 may further include a transparent display 630.

The transparent display 630 may be positioned on a third reflector.

The transparent display 630 may form a specific content.

The transparent display 630 may allow some or all of the second light 411, which is generated by the second light source 410, to pass.

In some implementations, the transparent display 630 may remain transparent by default. In this case, the transparent display 630 may allow the second light 411, which is generated by the second light source 410, to pass.

Figure 17:
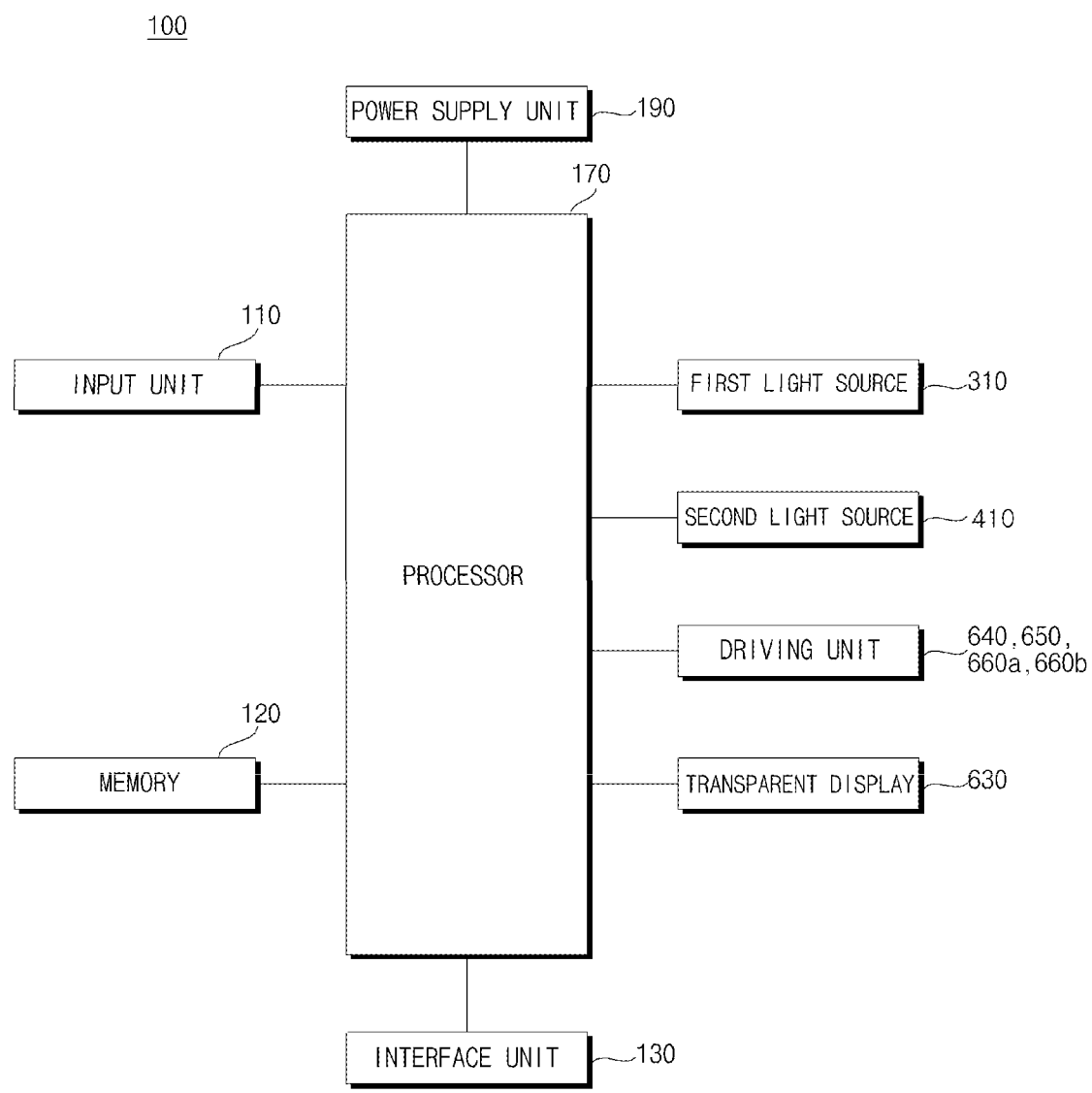
FIG. 17 is a block diagram illustrating an example of a lamp for a vehicle according to some implementations.

The transparent display 630 may operate based on a control signal received from a processor 170 (see FIG. 17).

In one region of the transparent display 630, a specific content may be displayed. The content may be displayed through a change in contrast and color. In the case where the second light 411 is displayed after passing through the transparent display 630 displaying the specific content, a portion of the second light 411 passing through a region of the transparent display 630 displaying the specific content may have a brightness level or color different from a portion of the second light 411 passing through a region of the transparent display 630 not displaying the specific content. In this manner, if the second light 411 is transmitted through the transparent display 630 on which specific information 530 is displayed, the specific information 530 may be displayed on an illumination area.

In one region of the transparent display 630, a pattern may be formed based on the difference in brightness or color. The pattern may be generated based on the difference in brightness or color between a first region and a second region of the transparent display 630.

In some implementations, the transparent display 630 may be implemented as a transparent electric device having a specific transmittance level.

The transparent display 630 may be divided into a projection-type transparent display or a direct-view transparent display.

In some implementations, the transparent display 630 may be at least one of a transparent TFEL, a transparent Organic Light Emitting Diode (OLED), a transparent Liquid Crystal Display (LCD), a transparent Plasma Display Panel (PDP), a transparent Light Emitting Diode (LED), and a transparent Active Matrix Light Emitting Diode (AMO-LED).

The transparent display 630 may be controlled by the processor 170 (see FIG. 17).

Figure 8:
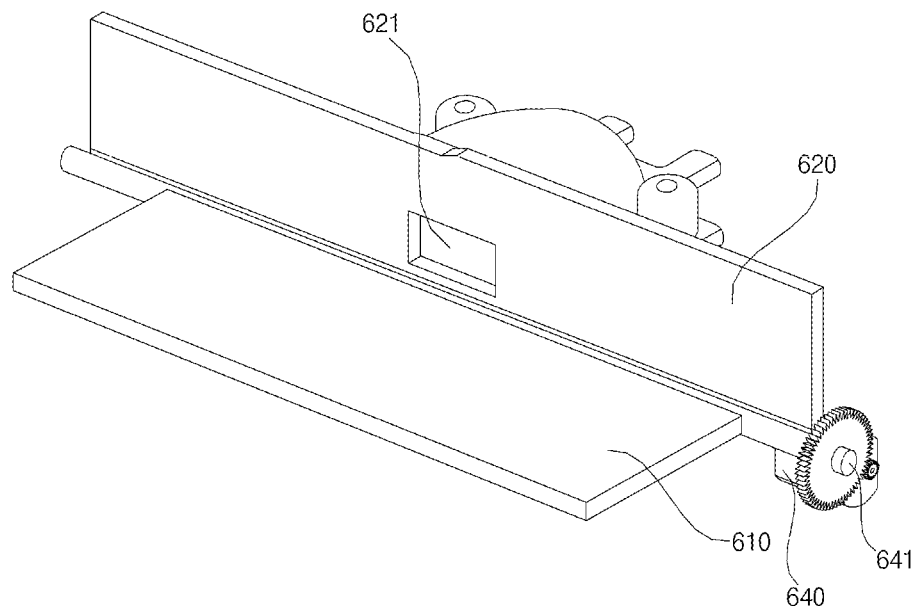
FIGS. 8 to 10 are diagrams illustrating an example of a driving unit and various movements of a third reflector according to some implementations.
Figure 8:
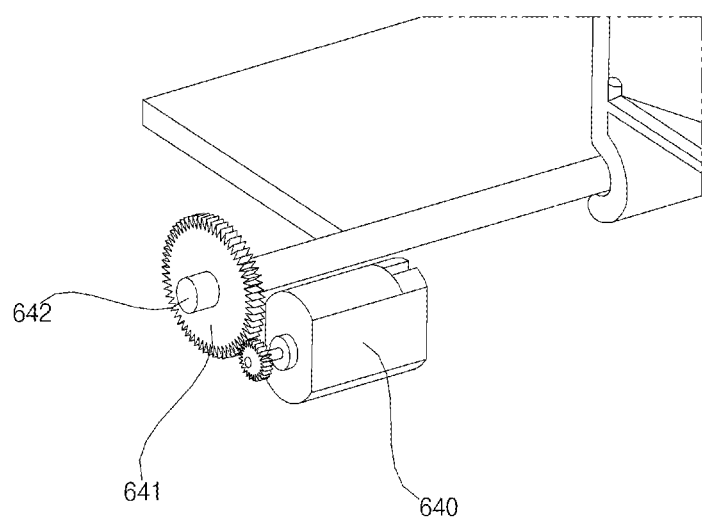
Figure 9:
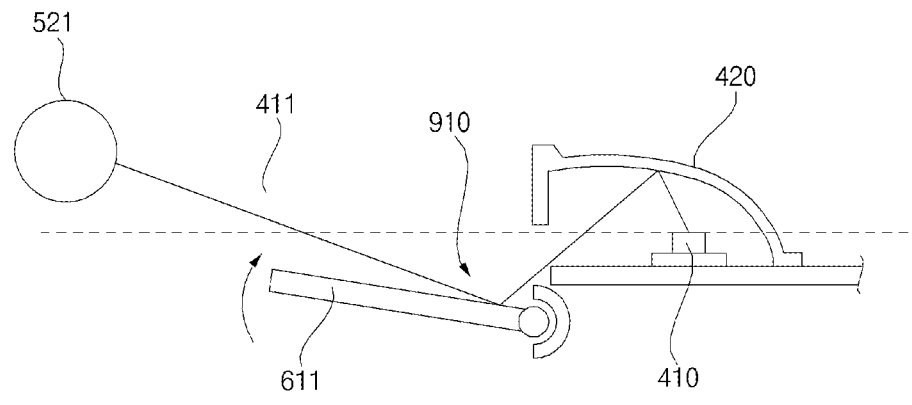
Figure 9:
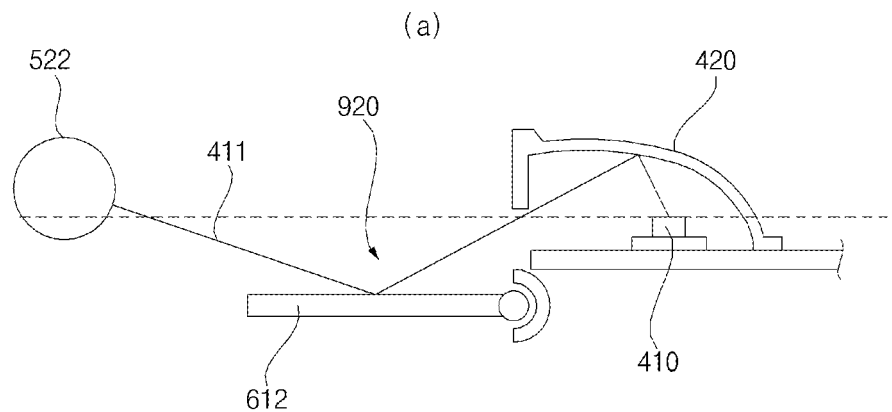
Figure 9:
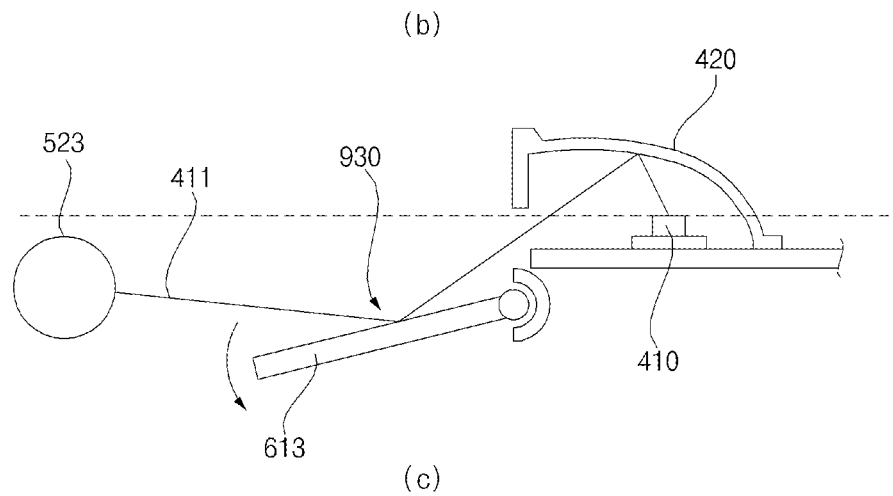
Figure 10:
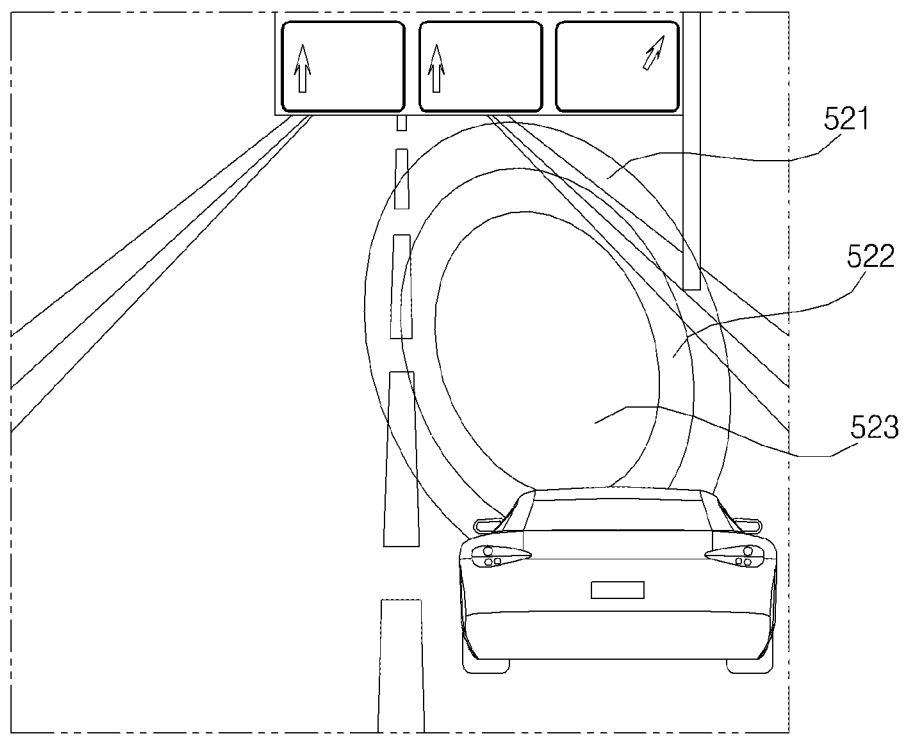

FIGS. 8 to 10 illustrates an example of a driving unit and various movements of a third reflector.

FIGS. 8A and 8B are diagrams illustrating a driving unit, a driving force transfer unit, and a third reflector according to an implementation of the present disclosure.

Referring to FIGS. 8A and 8B, the lamp 100 may further include a driving unit 640 and a driving force transfer unit 641.

The driving unit 640 may generate a driving force and provide the generated driving force. The driving force may be a rotational driving force.

The driving force 640 may include any one selected from among a motor, an actuator, and a solenoid.

The driving unit 640 may operate based on an electrical signal provided by the processor 170 (see FIG. 17).

The driving force transfer unit 641 may transfer a driving force, generated by the driving unit 640, to the third reflector 610.

As illustrated in FIGS. 8A and 8B, the driving force transfer unit 641 may be in the form of a gear connected to the center of a shaft 642 which is formed in the left and right direction.

Based upon a driving force provided by the driving unit 640, the third reflector 610 may rotate in the up and down direction relative to the shaft 641, formed in the left and right direction.

FIGS. 9A-9C illustrate various rotational movements of a third reflector according to an implementation of the present disclosure.

FIG. 10 illustrates a change in a beam pattern in response to the rotational movements of a third reflector according to an implementation of the present disclosure.

Referring to FIGS. 9A-9C, a projection length of the second light 411 may be adjusted based on a rotational orientation of the third reflector 610.

Referring to FIG. 9A, based upon a driving force provided by the driving unit 640 may cause the position of the third reflector 610 to switch to a first state 910.

The first state 910 may be a state to which the third reflector 610 has been switched from a second state 920 by rotating upward relative to shaft 642 by the driving force.

When the third reflector 610 is switched to the first state 910, the second light 411 is directed further upward relative to when the third reflector 610 is in the second state 920. In this case, the second light 411 may be projected further down the road relative to when the third reflector 610 is in the second state 920. In this case, an illuminated area by the second beam pattern 521 formed in the first state 910 may be larger than an illuminated area by the second beam pattern 522 formed in the second state 920.

Referring to FIG. 9B, based upon a driving force provided by the driving unit 640, the third reflector 610 may be switched to the second state 920.

The second state 920 may be a state in which the third reflector 610 is in parallel with the road.

The second state 920 may be a default state set in the manufacturing process of the lamp 100.

Referring to FIG. 9C, based upon a driving force provided by the driving unit 640, the third reflector 610 may be switched to a third state 930.

The third state 930 may be a state in which the third reflector 610 has been switched from the second state 920 by rotating downward relative to the shaft 642 by the driving force.

When the third reflector 610 is switched to the third state 930, the second light 411 may be projected along a shorter distance relative to when the third reflector 610 is in the second state 920. In this case, an area illuminated by a second beam pattern 523 formed in the third state 930 is smaller than the illuminated area formed by the second beam pattern 522 formed in the second state 920.

FIGS. 11 to 16 illustrate another example of a driving unit and various movements of a third reflector. In these examples, the driving unit and third reflector adaptively configure to adjust the horizontal width and longitudinal length of a beam pattern projected from the vehicle.

Figure 11:
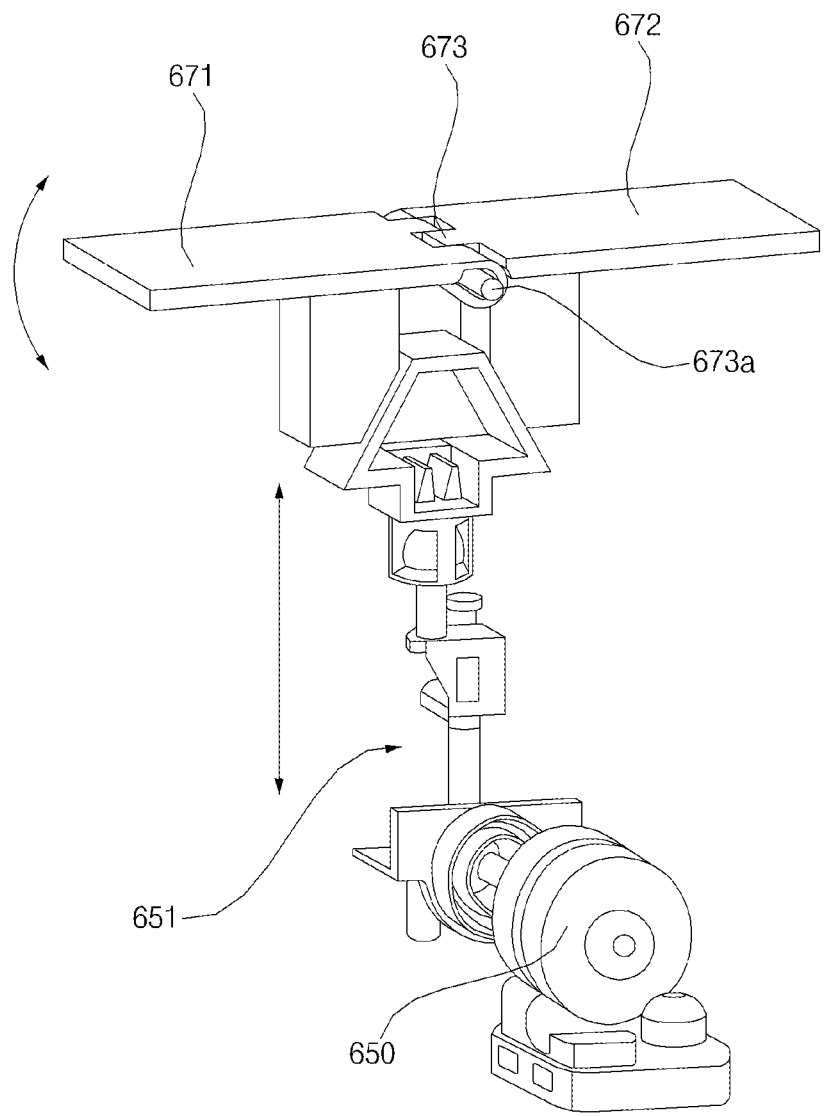
FIGS. 11 to 16 are diagrams illustrating another example of a driving unit and various movements of a third reflector according to some implementations.
Figure 12:
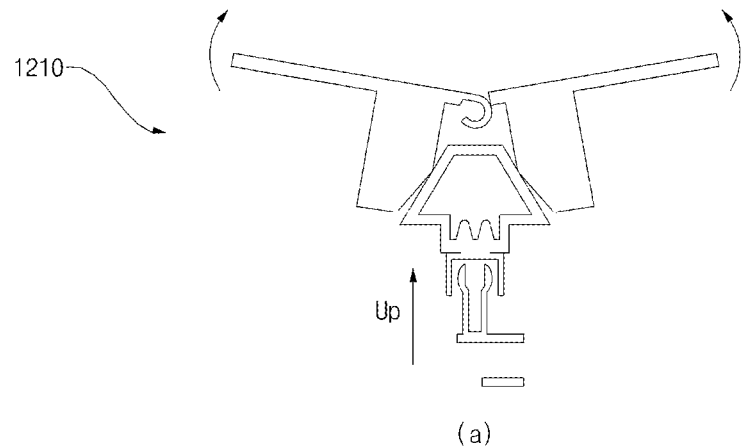
Figure 12:
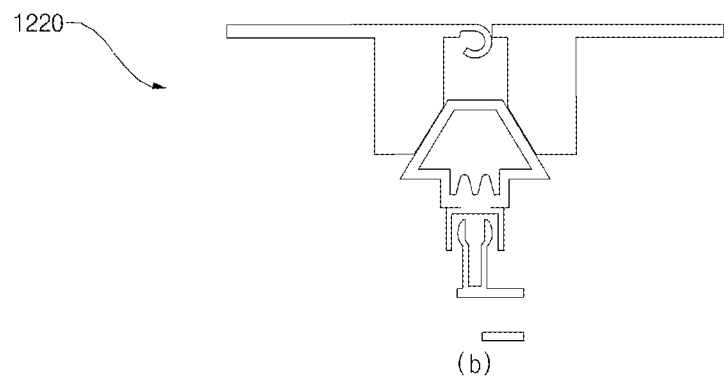
Figure 12:
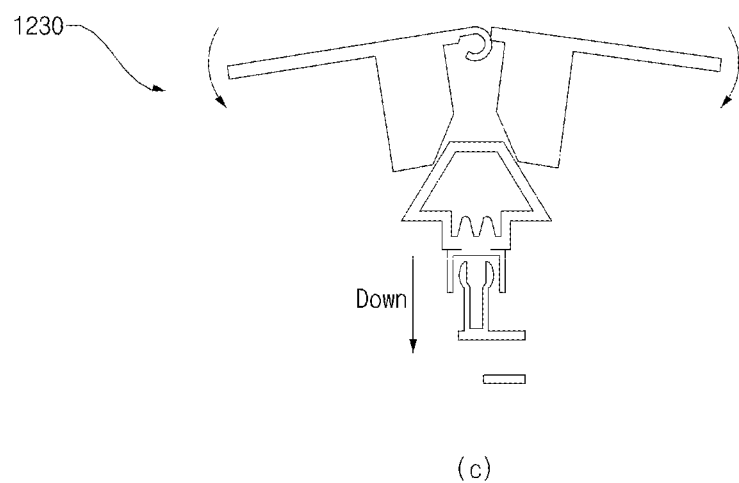

FIG. 11 illustrates a driving unit, a driving force transfer unit, and a third reflector according to an implementation of the present disclosure.

Referring to FIG. 11, the lamp 100 may further include a driving unit 650 and a driving force transfer unit 651.

The driving unit 650 may generate a driving force and provide the generated driving force. The driving force may be a rotational driving force.

The driving unit 650 may include any one selected from among a motor, an actuator, and a solenoid.

The driving unit 650 may operate based on an electric signal provided by the processor 170 (see FIG. 17).

The driving force transfer unit 651 may transfer a driving force, generated by the driving unit 650, to the third reflector 610.

In some implementations, the third reflector 610 may include a first mirror 671, a second mirror 672, and a hinge 673 formed between the first mirror 671 and the second mirror 672.

The hinge 673 may be mechanically connected to the first mirror 671 and the second mirror 672.

The hinge 673 may include a hinge 673a.

The driving force transfer unit 651 may transfer a driving force to the hinge 673. In this case, the first mirror 671 and the second mirror 672 may rotate together in the up and down direction relative to the hinge shaft 673a, formed in the front and rear direction, based upon a driving force.

For example, the driving force transfer unit 651 may convert a rotational movement into a linear movement along the up and down direction. In response to a rotational driving force provided from the driving unit 650, the driving force transfer unit 651 may convert the rotational driving force into a linear driving force along the up and down direction. In this case, the hinge 673 connected to the driving force transfer unit 651 may move linearly along the up and down direction. In response to the linear up and down movement of the hinge 673, the first mirror 671 and the second mirror 672 rotate in the up and down direction relative to the hinge shaft 673. In this example, the first mirror 671 and the second mirror 672 may rotate bisymmetrically.

FIGS. 12A-12C illustrate rotational movements of a third reflector according to an implementation of the present disclosure.

Figure 13:
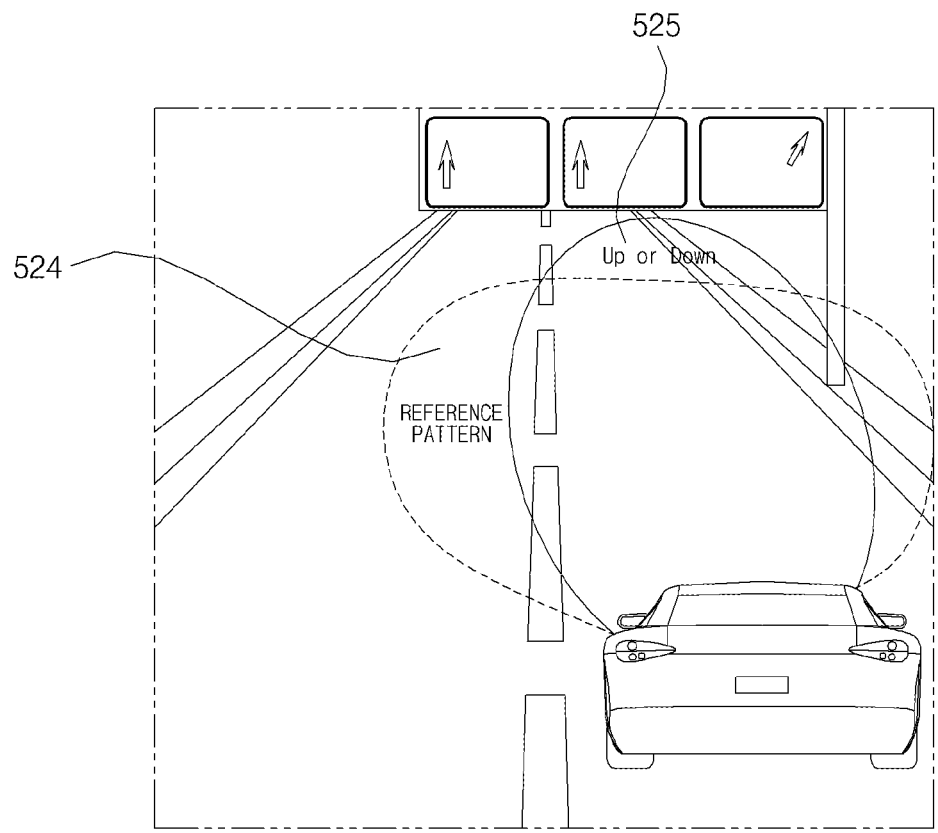

FIG. 13 illustrates changes in a beam pattern in response to rotational movement of the third reflector according to an implementation of the present disclosure.

Referring to FIG. 12A, a projection width of a second light 411 may be adjusted based on a rotation of the first mirror 671 and the second mirror 672.

Based upon a driving force provided by the driving unit 650, the first mirror 671 and the second mirror 672 may be switched to a first state 1210.

The first state 1210 may be a state in which the first mirror 671 and the second mirror 672 have been switched from a second state 1220 by moving upward relative to the hinge shaft 673*a* by the driving force.

When the first mirror 671 and the second mirror 672 are switched to the first state 1210, the second light 411 is directed further toward the optical axis 201 of the lens 200 relative to when the first mirror 671 and the second mirror 672 are in the second state 1220. In this case, the second light 411 projected in the first state 1210 may have a narrower width than the second light 411 projected in the second state 1220. In this case, referring to FIG. 13, a second beam pattern 525 of the first state 1210 is laterally narrower along the left and right direction and longer along the front and rear direction, relative to the second beam pattern 524 of the second state 1220.

Referring to FIG. 12B, based upon the driving force provided by the driving unit 650, the first mirror 671 and the second mirror 672 may be switched to the second state 1220.

The second state 1220 may be a state in which the first mirror 671 and the second mirror 672 are approximately parallel to the road.

For example, the second state 1220 may be a default state set during the manufacturing of the lamp 100.

Referring to FIG. 12C, based upon the driving force provided by the driving unit 650, the first mirror 671 and the second mirror 672 may be switched to a third state 1230.

The third state 1230 may be a state in which the first mirror 671 and the second mirror 672 have been switched from the second state 1220 by moving downward relative to the hinge 673*a* by the driving force.

If the first mirror 671 and the second mirror 672 are switched to the third state 1230, the second light 411 is directed further away from the optical axis 201 of the lens 200 (e.g., in a horizontally outward direction) relative to when the first mirror 671 and the second mirror 672 are in the second state 1220. In this case, the second light 411 may have a wider width than the second light 411 emitted in the second state 1220. For example, in the example of FIG. 13, the beam pattern of the third state 1230 would be laterally wider in the left and right direction and longitudinally shorter in the front and rear direction, relative to the second beam pattern 524 of the second state 1220.

In some implementations, the first mirror 671 may be a convex mirror, and the second mirror 672 may be a convex mirror. When the first mirror 671 and the second mirror 672 are convex mirrors, respective beam patterns of the first, second, and third states 1210, 1220, and 1230 may differ accordingly from the foregoing descriptions of the beam patterns.

In some implementations, when the first mirror 671 and the second mirror 672 are switched to the first state 1210, the second light 411 is directed further toward the optical axis 201 of the lens 200 relative to when the first mirror 671 and the second mirror 672 are in the second state 1220. In this case, the second light 411 may have a narrower width than when the first mirror 671 and the second mirror 672 are in the second state 1220. In this case, the second beam pattern 525 of the first state 1210 may be laterally narrower in the left and right direction, relative to the second beam pattern 524 of the second state 1220.

As another example, in some implementations, when the first mirror 671 and the second mirror 672 are switched to the third state 1230, the second light 411 is directed further away from the optical axis 201 (that is, in a horizontally outward direction) relative to when the first mirror 671 and the second mirror 672 are in the second state 1220. In this case, the second light 411 may have a wider width than when the first mirror 671 and the second mirror 672 are in the second state 1220. In this case, the second beam pattern 525 may be laterally wider in the left and right direction, relative to the second beam pattern 524 of the second state 1220.

Figure 14:
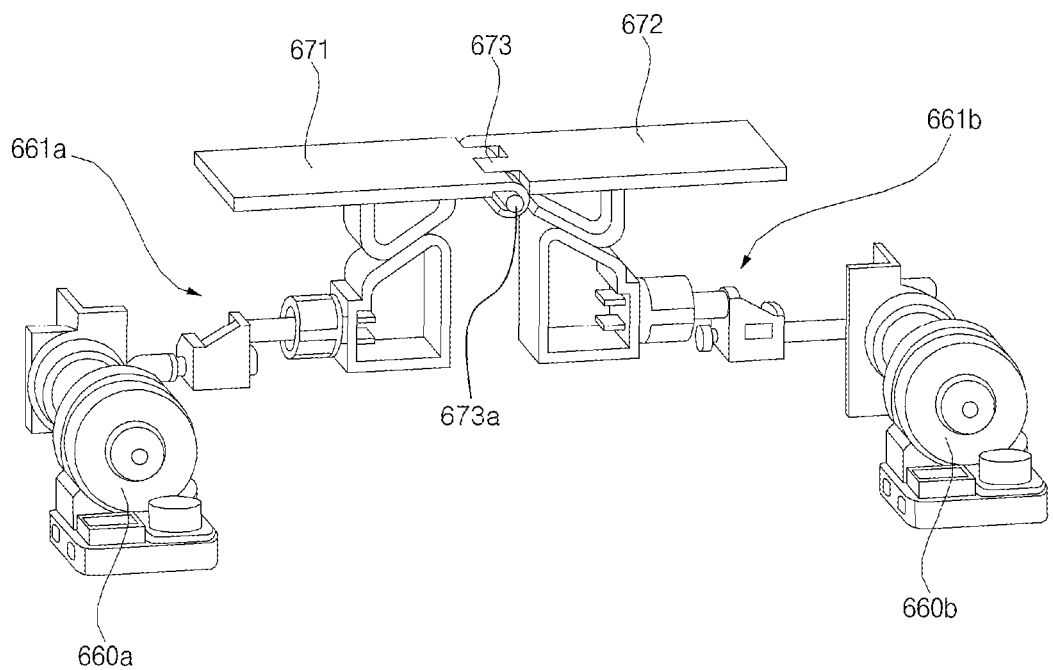

FIG. 14 illustrates a driving unit, a driving force transfer unit, and a third reflector according to an implementation of the present disclosure.

Referring to FIG. 14, the lamp 100 may further include a first driving unit 660*a*, a first driving force transfer unit 661*a*, a second driving unit 660*b*, and a second driving force transfer unit 661*b*.

The third reflector 610 may include a first mirror 671, a second mirror 672, and a hinge 673 formed between the first mirror 671 and the second mirror 672.

The first mirror 671 and the second mirror 672 may rotate independently based upon respective driving forces provided by the first driving unit 660*a* and the second driving unit 660*b*.

The hinge 673 may be mechanically connected to the first mirror 671 and the second mirror 672.

The hinge 673 may have a hinge shaft 673*a*. The hinge shaft 673*a* may be formed in the front and rear direction.

The first driving unit 660*a* may generate a first driving force and generate the first driving force. The first driving force may be a rotational driving force.

The first driving unit 660*a* may include any one selected from among a motor, an actuator, and a solenoid.

The first driving unit 660*a* may operate based on an electric signal provided by the processor 170 (see FIG. 17).

The first driving force transfer unit 661*a* may transfer the first driving force, generated by the first driving unit 660*a*, to the first mirror 671.

Based upon the first driving force, the first mirror 671 may rotate in the up and down direction relative to the hinge shaft 673*a*.

For example, the first driving force transfer unit 661*a* may convert the rotational movement into a linear up and down movement. When a rotational driving force is provided by the first driving unit 660*a*, the first driving force transfer unit 661*a* may convert the rotational driving force into a linear force along the up and down direction. In this case, the first mirror 671 connected to the first driving force transfer unit 661*a* may rotate in the up and down direction relative the hinge shaft 673*a*.

The second driving unit 660*b* may generate a second driving force and provide the second driving force. The second driving force may be a rotational force.

The second driving unit 660*b* may include any one selected from among a motor, an actuator, and a solenoid.

The second driving unit 660*b* may operate based on an electric signal provided by the processor 170 (see FIG. 17).

The second driving force transfer unit 661*b* may transfer the second driving force, generated by the second driving unit 660*b*, to the second mirror 671.

Based upon the second driving force, the second mirror 671 may rotate in the up and down direction relative to the hinge shaft 673*a*.

For example, the second driving force transfer unit 661*b* may convert the rotational movement into a linear up and down movement. When a rotational driving force is provided by the second driving unit 660*b*, the second driving unit 660*b* may convert the rotational driving force into a linear driving force along the up and down direction. In this case, the second mirror 671 connected to the second driving force transfer unit 661*b* may rotate in the up and down direction relative to the hinge shaft 673*a*.

Figure 15A:
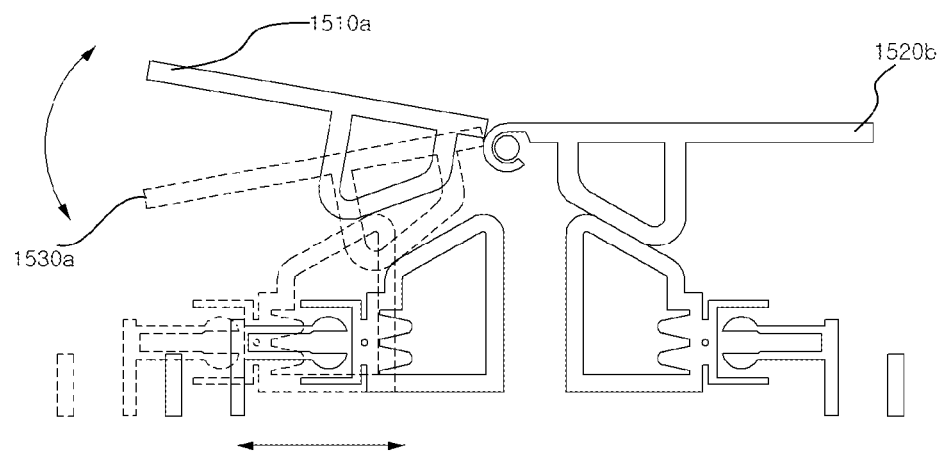
Figure 15B:
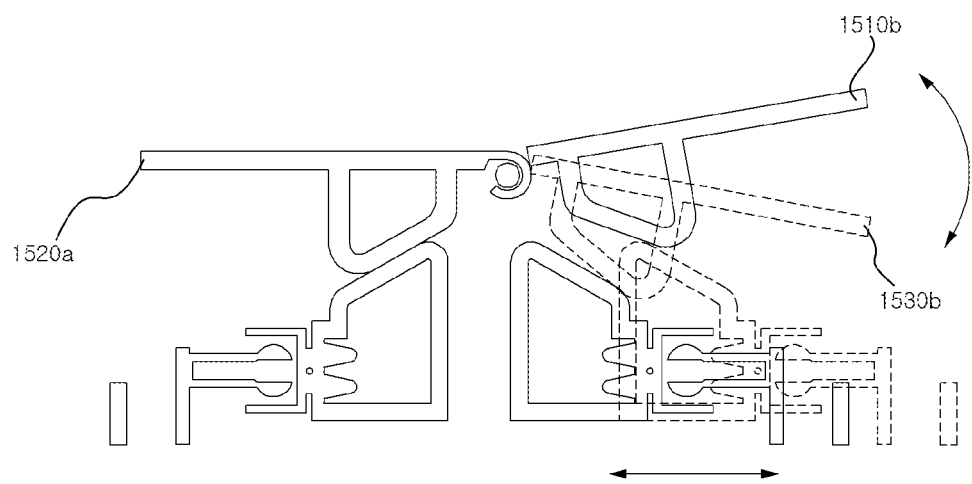

FIGS. 15A-15B illustrate rotational movements of a third reflector according to an implementation of the present disclosure.

Figure 16:
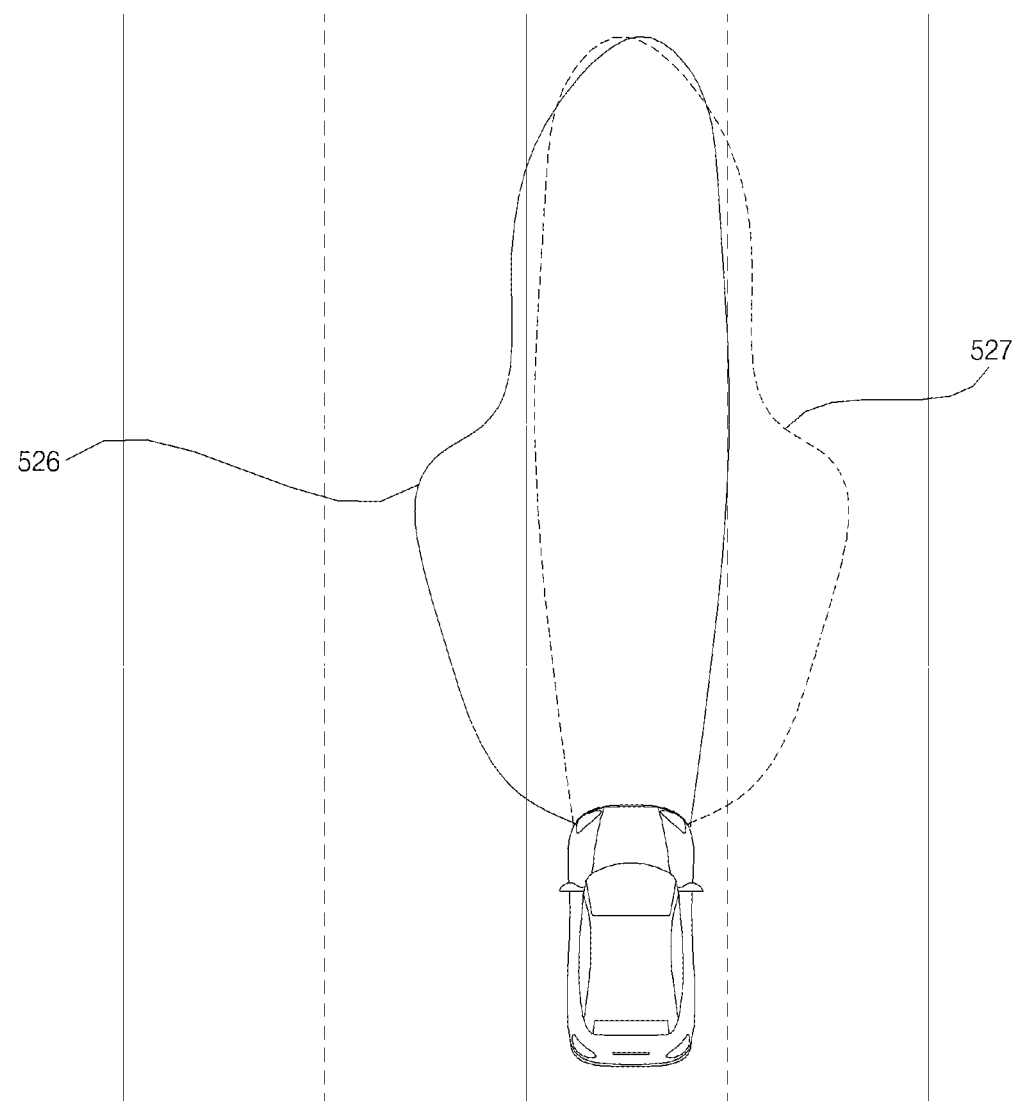

FIG. 16 illustrates changes in a beam pattern in response to rotational movements of a third reflector according to an implementation of the present disclosure.

Referring to FIGS. 15A-15B, a projection width of a second light 411 may be adjusted based on a rotation of the first mirror 671 or the second mirror 672.

Referring to FIGS. 15A and 15B, based upon a first driving force provided by the first driving unit 660a, the first driving unit 660a may be switched between a first state 1510a, a second state 1520a, and a third state 1530a.

The first state 1510a may be a state in which the first mirror 671 has been switched from the second state 1520a by moving upward relative to the hinge shaft 673a, formed in the front and rear direction, by the first driving force.

If the first mirror 671 is switched to the first state 1510a, the left side of the second light 411 is directed further toward the optical axis 201 of the lens 200, relative to when the first mirror 671 is in the second state 1520a. In this case, the left side of the second light 411 may have a narrower width than the left side of the second light 411 projected in the second state 1520a. In this case, a second beam pattern 526 of the first state 1510a is formed such that the left side thereof is formed narrower along the left and right direction and longer along the front and rear direction than the left side of a beam pattern of the second state 1520a.

Based upon a first driving force provided by the first driving unit 660a, the first mirror 671 may be switched to a second state 1520a, as shown in FIG. 15B.

The second state 1520a may be a state in which the first mirror 671 is approximately parallel to the road.

The second state 1520a may be a default state set during the manufacturing of the lamp 100.

Referring back to FIG. 15A, based upon the first driving force provided by the first driving force 660a, the first mirror 671 may be switched to the third state 1530a.

The third state 1530a may be a state in which the first mirror 671 has been switched from the second state 1520a by moving downward relative to the hinge shaft 673a by the first driving force.

If the position of the first mirror 671 is switched to the third state 1530a, the second light 411 is directed further away from the optical axis 201 of the lens 200 (e.g., in a horizontally outward direction), compared to when the first mirror 671 is in the second state 1520a. In this case, the left side of the second light 411 may have a wider lateral width, relative to the left side of the second light 411 projected in the second state 1520a. In this case, as shown in FIG. 16, a second beam pattern 526 of the third state is formed such that the left side thereof is laterally wider along the left and the right direction and longitudinally shorter along the front and rear direction, relative to the left side of a beam pattern of the second state 1520a.

In some implementations, the operation of the second mirror 672 (e.g., controlling the right side of the second light 411) may be analogous to the operation described above regarding the first mirror 671.

For example, referring again to FIGS. 15A and 15B, based upon a second driving force provided by the second driving unit 660b, the second mirror 672 may be switched between a first state 1510b, a second state 1520b, and a third state 1530b.

The first state 1510b may be a state in which the second mirror 672 has been switched from the second state 1520b by moving upward relative to the hinge shaft 673a, formed in the front and rear direction, by the second driving force.

If the second mirror 672 is switched to the first state 1510b, the right side of the second light 411 is directed further toward the optical axis 201 of the lens 200, compared to when the second mirror 672 is in the second state 1520b. In this case, the right side of the second light 411 may have a narrower width than the right side of the second light 411 projected in the second state 1520b. In this case, as shown in FIG. 16, a second beam pattern 527 of the first state 1510b is formed such that the right side thereof is narrower in the left and right direction and longer in the front and rear direction, relative to the right side of a beam pattern of the second state 1520b.

Based upon a second driving force provided by the second driving unit 660b, the second mirror 672 may be switched to the second state 1520b, as shown in FIG. 15A.

The second state 1520b may be a state in which the second mirror 672 is approximately parallel to the road.

The second state 1520b may be a default state set during the manufacturing of the lamp 100.

Referring back to FIG. 15B, based upon the second driving force provided by the second driving unit 660b, the second mirror 672 may be switched to the third state 1530b.

The third state 1530b may be a state in which the second mirror 672 has been switched from the second state 1520b by moving downward relative to the hinge shaft 673a by the second driving force.

When the second mirror 672 is switched to the third state 1530b, the second light 411 is directed further away from the optical axis 201 of the lens 200 (e.g., in a horizontally outward direction), relative to when the second mirror 672 is in the second state 1520b. In this case, the right part of the second light 411 may have a wider width than the right part of the second light 411 projected in the second state 1520b. In addition, as shown in FIG. 16, a second beam pattern 527 of the third state 1530b may be formed such that the right side thereof is wider along the left and right direction and shorter along the front and rear direction, relative to the right side of the beam pattern of the second state.

FIG. 17 illustrates a block diagram of an example of a lamp for a vehicle.

Referring to FIG. 17, the lamp 100 may include an input unit 110, a memory 120, an interface unit 130, a processor 170, a first light source 310, a second light source 410, and a power supply unit 190.

In some implementations, the lamp 100 may further include driving units 640, 650, 660a, and 660b, and a transparent display 630 individually or in combination.

The input unit 110 may be configured to receive a user input for controlling various operations of the lamp 100. Examples include a touch-type input unit or a mechanical input unit.

The input unit 110 may be configured to receive a user input for controlling the lamp 100. Examples of user inputs include input for turning on or off the lamp 100, and input for controlling various operations of the lamp 100.

The input unit 110 may be provided inside a vehicle 10.

The memory 120 may store basic data for each unit, control data for the operational control of each unit, and data that is input to and output from the lamp 100.

The memory 120 may be any of various hardware storage devices, such as a ROM, a RAM, an EPROM, a flash drive, and a hard drive.

The memory 120 may store various data for the overall operation of the lamp 100, such as programs for the processing or controlling of the processor 170.

The interface unit 130 may exchange data with a different device included in the vehicle 10.

The interface unit 130 may receive vehicle related data or a user input, or may transmit data processed or generated by the processor to a different device.

The interface unit 130 may receive driving situation information.

The driving situation information may include at least one of the following: object information about an object outside the vehicle, navigation information, and vehicle state information.

Examples of the object information may include: information about the presence of an object, location information of the object, information on distance between the vehicle and the object, and the speed of the object relative to the vehicle 100.

Examples of the object may include a lane, a nearby vehicle, a pedestrian, a two-wheeled vehicle, a traffic signal, a light, a road, a structure, a bump, a geographical feature, and an animal.

The navigation information may include at least one of the following: map information; information on a set destination; information on a route to the set destination; information on various objects along the route; lane information; and information on a current location of the vehicle.

Examples of the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, and vehicle engine temperature information.

The processor 170 may be electrically connected to each component of the lamp 100. The processor 170 may control the overall operation of each component of the lamp 100.

The processor 170 may control the first light source 310 and the second light source 410 based on a user input or driving situation information.

The processor 170 may control the driving units 640, 650, 660a, and 660b based on a user input or driving situation information.

For example, the processor 170 may control the driving units 640, 650, 660a, and 660b based on object information.

For example, based on information on an opposing vehicle, the processor 170 may control the driving units 650, 660a, and 660b to not project light toward the opposing vehicle by reducing a width of the output light projected toward the opposing vehicle.

For example, based on information on a preceding vehicle, the processor 170 may control the driving units 640, 650, 660a, and 660b to avoid projecting light toward the preceding vehicle by reducing a length of the output light.

The processor 170 may control the transparent display 630 based on a user input or driving situation information.

For example, the processor 170 may control the transparent display 630 to display an image corresponding to object information.

For example, the processor may control the transparent display 630 to display an image corresponding to navigation information.

For example, the processor 170 may control the transparent display 630 to display an image corresponding to vehicle state information.

The first light source 310 may generate a first light. The first light source 310 may convert electrical energy into light energy under control of the processor 170. The first light source 310 may include any one selected from among a metal filament lamp, a halogen bulb, a high intensity discharge (HID) lamp, a neon gas discharge lamp, a light emitting diode (LED), and a laser diode.

The second light source 410 may generate a second light. The second light source 410 may convert electrical energy into light energy under control of the processor 170. The second light source 410 may include any one selected from among a metal filament lamp, a halogen bulb, a high intensity discharge (HID) lamp, a neon gas discharge lamp, a light emitting diode (LED), and a laser diode.

Under control of the processor 170, the power supply unit 190 may supply power required for operation of each unit of the lamp 100. In particular, the power supply unit 190 may be supplied with power from a battery inside the vehicle 10.

The driving units 640, 650, 660a, and 660b may generate a driving force under control of the processor 170.

Under control of the processor 170, the transparent display 630 may let some or all of the second light 411, generated by the second light source 410, to pass.

The transparent display 630 may remain transparent by default. In this case, the transparent display 630 may let the second light 411, generated by the second light source 410, to pass.

The transparent display 630 may operate based on a control signal received by the processor 170.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A lamp for a vehicle, comprising:
a lens;
a first light source positioned at a rear side of the lens and configured to generate a first light;
a first reflector configured to reflect the first light toward the lens;
a second light source positioned at the rear side of the lens and configured to generate a second light;
a second reflector configured to reflect the second light toward the lens;
a third reflector configured to reflect the second light reflected by the second reflector, the third reflector comprising a first mirror, a second mirror, and a hinge that is rotatably coupled to the first mirror and the second mirror and that includes a hinge shaft extending in a front and rear direction of the vehicle;
a first driving unit configured to provide first driving force;
a first driving force transfer unit configured to transfer the first driving force to the first mirror;
a second driving unit configured to provide second driving force; and
a second driving force transfer unit configured to transfer the second driving force to the second mirror,
wherein the first light source is configured to output the first light in a first direction, and the second light source is configured to output the second light in the first direction,
wherein the first mirror is configured to, based upon the first driving force, rotate in an up and down direction of the vehicle about the hinge shaft, and wherein the second mirror is configured to, based upon the second driving force, rotate in the up and down direction of the vehicle about the hinge shaft.

2. The lamp according to claim 1, wherein the second reflector is positioned between the first reflector and the lens.

3. The lamp of claim 2, wherein the second reflector is configured and positioned to block a portion of the first light reflected by the first reflector.

4. The lamp of claim 3, wherein a portion of the first light not blocked by the second reflector passes through the lens to form a first beam pattern.

5. The lamp of claim 3, wherein the second reflector comprises:
a reflection part having a first surface and a second surface and configured to reflect the second light on the first surface; and
a shield part formed on the second surface of the reflection part opposite to the first surface.

6. The lamp of claim 1, wherein the first reflector is positioned above the first light source and the first light source is configured to output the first light toward the first reflector in an upward direction, and
wherein the second reflector is positioned above the second light source and the second light source is configured to output the second light toward the second reflector in the upward direction.

7. The lamp of claim 1, wherein the second light reflected by the third reflector passes through the lens to form a second beam pattern.

8. The lamp of claim 7, wherein the second beam pattern is biased forward or backward with respect to a reference line, the reference line corresponding to a projection of a horizontal centerline of the lens formed on an entire illumination area of the lamp.

9. The lamp of claim 7, further comprising a transparent display configured to form an image of a specific content such that during operation, the image of the specific content is formed on a surface.

10. The lamp of claim 7, further comprising:
a driving unit configured to provide a driving force; and
a driving force transfer unit configured to transfer the driving force to the third reflector,
wherein the third reflector is configured to, based on the driving force, rotate in an up and down direction about a shaft arranged along a left and right direction of the vehicle.

11. The lamp of claim 10, wherein a projection length of the second light varies depending on the rotation of the third reflector.

12. The lamp of claim 1, wherein a projection width of the second light varies depending on the rotation of the first mirror and the second mirror.

13. A vehicle comprising:
a plurality of wheels;
a power source configured to drive at least two of the plurality of wheels; and
the lamp of claim 1.

14. A lamp for a vehicle, comprising:
a lens;
a first light source positioned at a rear side of the lens and configured to generate a first light;
a first reflector configured to reflect the first light toward the lens;
a second light source positioned at the rear side of the lens and configured to generate a second light;
a second reflector configured to reflect the second light toward the lens;
a third reflector configured to reflect the second light reflected by the second reflector, the third reflector comprising a first mirror, a second mirror, and a hinge that is rotatably coupled to the first mirror and the second mirror and that includes a hinge shaft extending in a front and rear direction of the vehicle;
a first driving unit configured to provide a first driving force;
a first driving force transfer unit configured to transfer the first driving force to the first mirror;
a second driving unit configured to provide a second driving force; and
a second driving force transfer unit configured to transfer the second driving force to the second mirror,
wherein the second reflector is configured and positioned to block a portion of the first light reflected by the first reflector,
wherein the first mirror is configured to, based upon the first driving force, rotate in an up and down direction of the vehicle about the hinge shaft, and
wherein the second mirror is configured to, based upon the second driving force, rotate in the up and down direction of the vehicle about the hinge shaft.

15. The lamp of claim 14, wherein the first light source is configured to output the first light in a first direction, and the second light source is configured to output the second light in the first direction.

\* \* \* \* \*